United States Patent
Shi et al.

(10) Patent No.: US 10,077,999 B2
(45) Date of Patent: Sep. 18, 2018

(54) VOLUME SENSING IN FLUIDIC CARTRIDGE

(71) Applicant: CYTOCHIP INC., Duarte, CA (US)

(72) Inventors: Wendian Shi, Monrovia, CA (US); Yuzhe Ding, Monrovia, CA (US)

(73) Assignee: CYTOCHIP INC., Irvine, CA (US)

( * ) Notice: Subject to any disclaimer, the term of this patent is extended or adjusted under 35 U.S.C. 154(b) by 36 days.

(21) Appl. No.: 15/209,226

(22) Filed: Jul. 13, 2016

(65) Prior Publication Data

US 2017/0016753 A1    Jan. 19, 2017

Related U.S. Application Data

(60) Provisional application No. 62/192,488, filed on Jul. 14, 2015.

(51) Int. Cl.
*G01F 17/00* (2006.01)
*G01F 22/00* (2006.01)
*G01F 23/26* (2006.01)

(52) U.S. Cl.
CPC ............ *G01F 22/00* (2013.01); *G01F 23/265* (2013.01)

(58) Field of Classification Search
CPC ........ G01F 22/00; G01F 23/265; G01F 17/00; G01F 19/002; G01F 25/0007; G01N 31/222; G01N 30/02; G01N 33/2847; G01N 33/18; G01P 21/00
USPC ..... 73/149, 426, 61.61, 61.52, 61.43, 53.01, 73/61.41, 1.36, 1.01
See application file for complete search history.

(56) References Cited

U.S. PATENT DOCUMENTS

| | | | |
|---|---|---|---|
| 4,895,500 A | 1/1990 | Hok et al. | |
| 4,983,523 A | 1/1991 | Li et al. | |
| 5,096,669 A | 3/1992 | Lauks et al. | |
| 5,110,724 A | 5/1992 | Hewett | |

(Continued)

FOREIGN PATENT DOCUMENTS

| | | |
|---|---|---|
| WO | 2016/200922 A1 | 12/2016 |
| WO | 2017/011554 A1 | 1/2017 |

OTHER PUBLICATIONS

Al-Faqheri et al., Development of a passive liquid valve (PLV) utilizing a pressure equilibrium phenomenon on the centrifugal microfluidic platform. Sensors, 15(3):4658-4676 (2015).

(Continued)

*Primary Examiner* — Manish S Shah
*Assistant Examiner* — Nigel Plumb
(74) *Attorney, Agent, or Firm* — K&L Gates LLP

(57) ABSTRACT

Methods and apparatuses for measuring parameters based on the presence or absence of fluid at a plurality of fluid sensing zones in a disposable cassette are described herein. In an embodiment, a fluidic device includes a disposable cartridge including a fluid channel, an instrument configured to receive the disposable cartridge, the instrument including at least one sensor having a plurality of fluid sensing zones spaced along the fluid channel when the disposable cartridge is received by the disposable cartridge, each fluid sensing zone configured to determine a presence or absence of fluid at a respective portion of the fluid channel, and a control unit configured to determine at least one of a fluid volume, a volume displacement, a flow rate, a flow velocity or a volume ratio of gas bubbles of the fluid based on the presence or absence of the fluid at each of the fluid sensing zones.

27 Claims, 21 Drawing Sheets

(56) References Cited

U.S. PATENT DOCUMENTS

| | | | |
|---|---|---|---|
| 5,213,965 A | 5/1993 | Jones | |
| 5,409,665 A | 4/1995 | Burd | |
| 5,478,750 A | 12/1995 | Bernstein et al. | |
| 5,591,643 A | 1/1997 | Schembri | |
| 6,100,084 A | 8/2000 | Miles et al. | |
| 6,369,893 B1 | 4/2002 | Christel et al. | |
| 6,382,228 B1 | 5/2002 | Cabuz et al. | |
| 6,549,275 B1 | 4/2003 | Cabuz et al. | |
| 6,664,110 B1 | 12/2003 | Tsuji et al. | |
| 6,750,060 B2 | 6/2004 | Ozasa et al. | |
| 6,752,961 B2 | 6/2004 | Kopf-Sill et al. | |
| 6,804,984 B2 | 10/2004 | Shibata | |
| 7,016,022 B2 | 3/2006 | Fritz et al. | |
| 7,061,595 B2 | 6/2006 | Cabuz et al. | |
| 7,113,266 B1 | 9/2006 | Wells | |
| 7,130,046 B2 | 10/2006 | Fritz et al. | |
| 7,172,897 B2 | 2/2007 | Blackburn et al. | |
| 7,215,425 B2 | 5/2007 | Rezachek et al. | |
| 7,220,595 B2 | 5/2007 | Nugent et al. | |
| 7,318,900 B2 * | 1/2008 | Demarco | G01N 30/88 210/143 |
| 7,328,722 B2 | 2/2008 | Rich et al. | |
| 7,420,659 B1 | 9/2008 | Cabuz et al. | |
| 7,471,394 B2 | 12/2008 | Padmanabhan et al. | |
| 7,521,243 B2 | 4/2009 | Lindberg et al. | |
| 7,534,331 B2 | 5/2009 | Kayyem | |
| 7,553,453 B2 | 6/2009 | Gu et al. | |
| 7,580,120 B2 | 8/2009 | Hamada et al. | |
| 7,595,169 B2 | 9/2009 | Swaim et al. | |
| 7,632,462 B2 | 12/2009 | Holtlund et al. | |
| 7,641,856 B2 | 1/2010 | Padmanabhan et al. | |
| 7,760,351 B2 | 7/2010 | Cox et al. | |
| 7,771,658 B2 | 8/2010 | Larsen | |
| 7,800,742 B2 | 9/2010 | Fukuda et al. | |
| 7,832,429 B2 | 11/2010 | Young et al. | |
| 7,842,234 B2 | 11/2010 | Lauks et al. | |
| 7,843,563 B2 | 11/2010 | Fritz et al. | |
| 7,863,035 B2 | 1/2011 | Clemens et al. | |
| 7,894,047 B2 | 2/2011 | Hamada et al. | |
| 7,910,062 B2 | 3/2011 | Yu et al. | |
| 8,029,746 B2 | 10/2011 | Yu et al. | |
| 8,034,296 B2 | 10/2011 | Cox et al. | |
| 8,071,051 B2 | 12/2011 | Padmanabhan et al. | |
| 8,097,225 B2 | 1/2012 | Padmanabhan et al. | |
| 8,124,024 B2 | 2/2012 | Ching et al. | |
| 8,168,443 B2 | 5/2012 | Yu et al. | |
| 8,202,492 B2 | 6/2012 | Linder et al. | |
| 8,283,177 B2 | 10/2012 | Ball et al. | |
| 8,293,175 B2 | 10/2012 | Holtlund et al. | |
| 8,367,023 B2 | 2/2013 | Bae et al. | |
| 8,383,043 B2 | 2/2013 | Padmanabhan et al. | |
| 8,518,328 B2 | 8/2013 | Padmanabhan et al. | |
| 8,540,946 B2 | 9/2013 | Padmanabhan et al. | |
| 8,545,756 B2 | 10/2013 | Holtlund et al. | |
| 8,567,425 B2 | 10/2013 | Tan et al. | |
| 8,573,033 B2 | 11/2013 | Larsen | |
| 8,591,829 B2 | 11/2013 | Taylor et al. | |
| 8,646,842 B2 | 2/2014 | Barfuss | |
| 8,663,583 B2 | 3/2014 | Kelley et al. | |
| 8,741,233 B2 | 6/2014 | Bardell et al. | |
| 8,741,234 B2 | 6/2014 | Wang et al. | |
| 8,741,235 B2 | 6/2014 | Janisch et al. | |
| 8,747,747 B2 * | 6/2014 | Hunter | B01L 3/502715 141/146 |
| 8,828,320 B2 | 9/2014 | Barden et al. | |
| 8,846,380 B2 | 9/2014 | Bae et al. | |
| 8,980,635 B2 | 3/2015 | Kelley et al. | |
| 9,029,158 B2 | 5/2015 | Tai et al. | |
| 9,140,694 B2 | 9/2015 | Holtlund et al. | |
| 9,234,884 B2 | 1/2016 | Tai et al. | |
| 9,494,570 B2 | 11/2016 | Bransky et al. | |
| 2002/0042125 A1 * | 4/2002 | Petersen | B01L 3/502715 435/287.2 |
| 2004/0005247 A1 * | 1/2004 | Karp | B01L 3/50273 422/400 |
| 2005/0136552 A1 | 6/2005 | Buechler | |
| 2007/0039835 A1 | 2/2007 | Rossier et al. | |
| 2007/0154351 A1 | 7/2007 | Bae et al. | |
| 2008/0199971 A1 * | 8/2008 | Tondra | G01R 33/12 436/149 |
| 2009/0075390 A1 | 3/2009 | Linder et al. | |
| 2009/0291507 A1 | 11/2009 | Clemens et al. | |
| 2010/0288689 A1 | 11/2010 | Zhu et al. | |
| 2013/0130262 A1 | 5/2013 | Battrell et al. | |
| 2013/0343955 A1 | 12/2013 | Doyle et al. | |
| 2013/0344475 A1 | 12/2013 | Jovanovich et al. | |
| 2014/0038809 A1 | 2/2014 | Bransky et al. | |
| 2014/0301915 A1 * | 10/2014 | Doyle | B01L 3/5055 422/554 |
| 2014/0349381 A1 | 11/2014 | Battrell et al. | |
| 2016/0361715 A1 | 12/2016 | Shi et al. | |

OTHER PUBLICATIONS

DuCree et al., The centrifugal microfluidic Bio-disk platform. Journal of Micromechanics and Microengineering, vol. 17:S103-S115 (2007).

Henning, Micro-Pneumatic Logic. 2004 ASME International Mechanical Engineering Congress and RD&D Expo, Anaheim, CA, Nov. 15-21, 2004.

International Search Report and Written Opinion issued in International Application No. PCT/US2016/036426 dated Sep. 6, 2016, 13 pages.

International Search Report and Written Opinion issued in related international patent application No. PCT/US2016/042089 dated Dec. 8, 2016. 14 pages.

* cited by examiner

VOLUME SENSING IN FLUIDIC CARTRIDGE

PRIORITY CLAIM

This application claims priority to U.S. Provisional Patent Application No. 62/192,488, entitled "Volume Sensing in Fluidic Cartridge", filed Jul. 14, 2015, the entire contents of which are hereby incorporated by reference and relied upon. All publications herein are incorporated by reference to the same extent as if each individual publication or patent application was specifically and individually indicated to be incorporated by reference.

FIELD OF THE DISCLOSURE

The present disclosure relates generally to methods and apparatuses for measuring parameters of a fluid sample within a disposable cassette, and more specifically to measuring parameters based on the presence or absence of fluid at a plurality of fluid sensing zones.

BACKGROUND OF THE DISCLOSURE

For analysis of biological samples, it is often desirable to use only a small sample volume. Therefore, a precise measurement of the volume could be crucial to the analysis accuracy. In the applications of point-of-care testing (POCT), the analysis of biological samples is preferably conducted in a disposable cartridge, which has the merits of ease of use and avoids cross-contamination from other samples. However, sensing volume in cartridges imposes new challenges particularly to measure a small volume with high accuracy. For example, the complexity of the cartridge limits the available choices of volume sensing methods.

Normally these cartridges use passive methods such as volumetric chambers to determine the fluid volume taken for analysis. The accuracy of these passive methods suffers from unpredicted variations, such as user operations (e.g. the volumetric chamber is not filled up properly or contains bubbles). These variations are particularly ubiquitous in POCT applications, where users replace cartridges before each analysis.

SUMMARY OF THE DISCLOSURE

The present disclosure uses an active sensing method to determine the fluid volume in-situ. Active sensing methods can accurately measure the fluid volume taken for analysis. However, hardware of the active sensing methods may add to the complexity and manufacturing cost of the cartridges. For a small sample volume in the range 1 nL to 1 mL, which is common in biological analysis, it is even more challenging to design a sensing method that delivers high accuracy with low hardware complexity for cartridges. Thus, the present disclosure is directed to a novel and more effective device for measuring and analyzing fluid volume.

In a general example embodiment, a fluidic device includes a disposable cartridge including a fluid channel configured to receive a fluid flow, an instrument configured to receive the disposable cartridge, the instrument including at least one sensor having a plurality of fluid sensing zones spaced along the fluid channel when the disposable cartridge is received by the instrument, each fluid sensing zone configured to determine a presence or absence of fluid at a respective portion of the fluid channel, and a control unit configured to (i) receive a signal indicative of the presence or absence of the fluid at each of the fluid sensing zones, and (ii) determine at least one of a fluid volume, a volume displacement, a flow rate, a flow velocity or a volume ratio of gas bubbles of the fluid based on the presence or absence of the fluid at each of the fluid sensing zones.

In another embodiment, the plurality of fluid sensing zones are spaced along a length of the fluid channel when the disposable cartridge is received by the instrument.

In another embodiment, the plurality of fluid sensing zones are spaced along a width of the fluid channel when the disposable cartridge is received by the instrument.

In another embodiment, the plurality of fluid sensing zones are each located on separate sensors configured to measure the presence or absence of fluid at the respective portion of the fluid channel along the length of the fluid channel.

In another embodiment, the plurality of fluid sensing zones are each located on the same sensor, and wherein the fluid channel has a winding shape through the disposable cartridge, and wherein the plurality of fluid sensing zones are aligned with sections of fluid channel that converge into a centralized portion of the sensor.

In another embodiment, the control unit is configured to determine the volume displacement of the fluid within the fluid channel based on the presence or absence of the fluid at each of the fluid sensing zones, wherein the fluid flowing through the fluid channel passes along the fluid sensing zones sequentially.

In another embodiment, the control unit is configured to determine the flow rate of the fluid within the fluid channel based on the presence or absence of the fluid at each of the fluid sensing zones, wherein the fluid flowing through the fluid channel passes along the fluid sensing zones sequentially.

In another embodiment, the control unit is configured to determine the volume of a fluid plug within the fluid channel based on the presence or absence of the fluid at each of the fluid sensing zones, wherein the fluid flowing through the fluid channel passes along the fluid sensing zones sequentially.

In another embodiment, the fluid channel has a known cross-sectional area, and wherein the control unit uses the known cross-sectional area of the fluid channel to determine at least one of the fluid volume, the volume displacement, the flow rate or the flow velocity of the fluid based on the presence or absence of the fluid at each of the fluid sensing zones.

In a general embodiment, a fluidic device includes a disposable cartridge including a fluid channel configured to receive a fluid flow, an instrument configured to receive the disposable cartridge, the instrument including at least one sensor having a plurality of fluid sensing zones spaced along a length of the fluid channel when the disposable cartridge is received by the instrument, each sensor including a light emitter and a light receiver, and a control unit configured to determine the presence or absence of fluid at each of the fluid sensing zones based on the light transmission from the respective emitter to the respective receiver in each sensor, wherein the level of light transmission is changed by the amount of light scattered with presence or absence of fluid in the fluid sensing zone.

In another embodiment, the controller is configured to use a surface roughness of at least a portion of the fluid channel to determine the presence or absence of fluid at each of the fluid sensing zones, wherein the surface roughness changes the amount of light scattered in each sensor.

In another embodiment, the controller is configured to use a refractive index of a material forming at least a portion of the fluid channel to determine the presence or absence of fluid at each of the fluid sensing zones, wherein the difference between the refractive index of the material and the refractive index of fluid in the channel changes the amount of light scattered in each sensor.

In another embodiment, the controller is configured to determine at least one of a fluid volume, a volume displacement, a flow rate, a flow velocity or a volume ratio of gas bubbles of the fluid based on the presence or absence of the fluid at each of the fluid sensing zones.

In a general embodiment, a method of configuring a disposable cartridge includes designing a disposable cartridge to have a fluid channel configured to receive a particular fluid sample, forming at least a portion of the fluid channel with a surface roughness using a material having a refractive index that matches the refractive index of the particular fluid sample, and configuring the portion of the fluid channel to align with a light emitter and a light receiver in a reader instrument when the disposable cartridge is received in the instrument for measurements.

In another embodiment, the method includes programming the reader instrument to determine the presence or absence of fluid in the fluid channel of the disposable cartridge based on the light transmission from the respective emitter to the respective receiver, wherein the level of light transmission is changed by the amount of light scattered when there is a presence or absence of fluid in the channel.

In another embodiment, the method includes configuring the portion of the fluid channel to align with a plurality of light emitters and light receiver along the width of the fluid channel.

In another embodiment, the method includes configuring the portion of the fluid channel to align with a plurality of light emitters and light receivers along the length of the fluid channel.

In another embodiment, the method includes programming the reader instrument to determine at least one of a fluid volume, a volume displacement, a flow rate, a flow velocity or a volume ratio of gas bubbles of the fluid based on the presence or absence of the fluid at each of the plurality of light emitters and light receivers.

In another embodiment, the method includes designing the fluid channel with a winding shape through the disposable cartridge so that each of the plurality of light emitters and light receivers are aligned with sections of the fluid channel in the disposable cartridge that are converged into a centralized portion.

In another embodiment, the method includes allowing for an alignment tolerance when aligning the plurality of light emitters and light receivers with the fluid channel in the cartridge by fixing the distance between the plurality of light emitters and light receivers before alignment.

In a general embodiment, a fluidic device includes a fluid channel configured to receive a fluid flow, a plurality of fluid sensing zones spaced along a length of the fluid channel, each fluid sensing zone configured to determine a presence or absence of fluid at a respective portion of the fluid channel along the length of the fluid channel, and a control unit configured to (i) receive a signal indicative of the presence or absence of the fluid at each of the fluid sensing zones, and (ii) determine at least one of a fluid volume, a volume displacement, a flow rate or a flow velocity of the fluid based on the presence or absence of the fluid at each of the fluid sensing zones In another embodiment, the control unit is configured to determine the fluid volume of the fluid within the flow channel based on the presence or absence of the fluid at each of the fluid sensing zones.

In another embodiment, the control unit is configured to determine the volume displacement of the fluid within the flow channel based on the presence or absence of the fluid at each of the fluid sensing zones.

In another embodiment, the control unit is configured to determine the flow rate of the fluid within the flow channel based on the presence or absence of the fluid at each of the fluid sensing zones.

In another embodiment, the control unit is configured to determine the flow velocity of the fluid within the flow channel based on the presence or absence of the fluid at each of the fluid sensing zones.

In another embodiment, the control unit uses a known cross-sectional area of the fluid channel to determine at least one of the fluid volume, the volume displacement, the flow rate or the flow velocity of the fluid based on the presence or absence of the fluid at each of the fluid sensing zones.

In another embodiment, the fluidic channel is located on a disposable cassette made at least partly of a transparent material.

In another embodiment, the plurality of fluid sensing zones are each located on separate sensors configured to measure the presence or absence of fluid at the respective portion of the fluid channel along the length of the fluid channel.

In another embodiment, the fluid sensing zones are configured to determine the presence or absence of fluid at a respective portion of the fluid channel along the length of the fluid channel using at least one of: (i) optical signals; (ii) electrical signals; (iii) acoustic signals; and (iv) thermal signals.

In a general embodiment, a fluidic device includes a fluid channel configured to receive a fluid flow, a plurality of fluid sensing zones spaced along a width of the fluidic channel, each fluid sensing zone configured to determine a presence or absence of fluid at a respective portion of the fluid channel along the width of the fluid channel, and a control unit configured to configured to (i) receive a signal indicative of the presence or absence of the fluid at each of the fluid sensing zones, and (ii) determine a quantity of air bubbles versus liquid within the fluid channel based on the presence or absence of the fluid at each of the fluid sensing zones.

In another embodiment, the control unit is configured to determine the quantity of air bubbles versus liquid within the fluid channel using widths of the plurality of fluid sensing zones.

In another embodiment, the control unit is configured to determine the quantity of air bubbles versus liquid within the fluid channel using a length of the fluid channel.

In a general embodiment, a method of monitoring fluid flow through a fluid channel includes aligning a plurality of fluid sensing zones with a length or a width of a fluid channel of a disposable cartridge, detecting a presence or absence of fluid at the plurality of fluid sensing zones, determining a parameter of the fluid based on the presence or absence of the fluid at each of the fluid sensing zones, and controlling flow of the fluid through the fluid channel of the disposable cartridge based on the determined parameter In another embodiment, determining a parameter includes determining a fluid volume of the fluid based on the presence or absence of the fluid at each of the fluid sensing zones.

In another embodiment, determining a parameter includes determining a volume displacement of the fluid based on the presence or absence of the fluid at each of the fluid sensing zones.

In another embodiment, determining a parameter includes determining a flow rate of the fluid based on the presence or absence of the fluid at each of the fluid sensing zones.

In another embodiment, determining a parameter includes determining a flow velocity of the fluid based on the presence or absence of the fluid at each of the fluid sensing zones.

In another embodiment, determining a parameter includes determining a quantity of air bubbles versus liquid within the fluid channel of the fluid based on the presence or absence of the fluid at each of the fluid sensing zones.

In another embodiment, allowing for an alignment tolerance when aligning the plurality of fluid sensing zones by fixing the distance between the plurality of fluid zones before alignment.

BRIEF DESCRIPTION OF THE DRAWINGS

Embodiments of the present disclosure will now be explained in further detail by way of example only with reference to the accompanying figures, in which.

DETAILED DESCRIPTION

Figure 1:
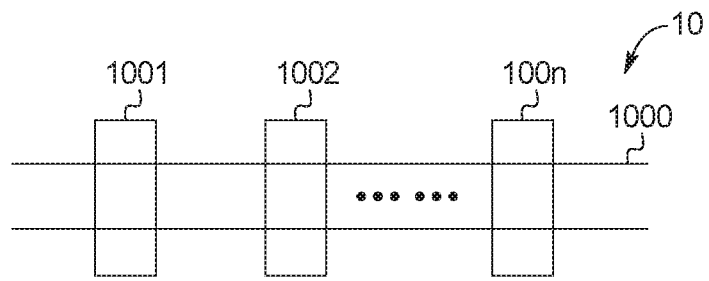
FIG. 1 depicts, in accordance with embodiments herein, an example embodiment of a sensing device. In the example embodiment of FIG. 1, when a fluid enters the fluid channel, the sensors measure the length of the channel that is filled with the fluid. The fluid volume is determined with the measured length and the known geometry of the channel.

All references cited herein are incorporated by reference in their entirety as though fully set forth. Unless defined otherwise, technical and scientific terms used herein have the same meaning as commonly understood by one of ordinary skill in the art to which this disclosure belongs. Hornyak, et al., Introduction to Nanoscience and Nanotechnology, CRC Press (2008); Singleton et al., Dictionary of Microbiology and Molecular Biology 3rd ed., J. Wiley & Sons (New York, N.Y. 2001); March, Advanced Organic Chemistry Reactions, Mechanisms and Structure 7th ed., J. Wiley & Sons (New York, N.Y. 2013); and Sambrook and Russel, Molecular Cloning: A Laboratory Manual 4th ed., Cold Spring Harbor Laboratory Press (Cold Spring Harbor, N.Y. 2012), provide one skilled in the art with a general guide to many of the terms used in the present application. One skilled in the art will recognize many methods and materials similar or equivalent to those described herein, which could be used in the practice of the present disclosure. Indeed, the present disclosure is in no way limited to the methods and materials described.

As described herein, various sensing designs were developed to overcome some of the challenges faced when analyzing samples using only a small sample volume, and specifically including cartridges.

In an embodiment, the present disclosure provides an active sensing method for determining fluid volume where a device comprising one or more sensors along the length of a fluidic channel is used to determine a fluid volume. In another embodiment, the present disclosure provides a device comprising one or more sensors along the length of a fluidic channel to determine a fluid volume. In another embodiment, the device is used to measure the volume displacement of a fluid flow. In another embodiment, the device is used to measure flow rate. In another embodiment, the device is used to measure flow velocity. In another embodiment, the device is used to determine the volume ratio of gas bubbles mixed in a fluid.

In an embodiment, the present disclosure provides a device comprising a plurality of sensors along the length of a fluidic channel. When a fluid enters the channel, the sensors measure the channel length that is filled up with the fluid. In an embodiment, from the measured length and the known geometry of the channel, a control unit can determine the fluid volume in the fluid channel. In an embodiment, the present disclosure provides a high accuracy of sensing small volumes by using a microfluidic channel that has a narrow cross-section so as to elongate the fluid length for measurement. In an embodiment, the channel width can be from about 0.001 mm to about 0.05 mm, about 0.05 mm to about 1 mm, or about 1 mm to about 5 mm, and the channel height can be from about 0.001 mm to about 0.01 mm, about 0.01 mm to about 0.5 mm, about 0.5 um to about 1 mm, or about 1 mm to about 2 mm.

In an embodiment, one or more sensors has a sensing zone that overlaps with the channel. In an embodiment, a sensor detects two distinct levels of a sensing signal, when there is fluid in the sensing zone versus when there is not. The transition of the signal from one level to another indicates a fluid flow into or away from the sensing zone. In an embodiment, the sensing zone has a geometry that is equal to, larger than or smaller than the width of the fluidic channel. In an embodiment, each sensor has a plurality of sensing zones along the channel length, and can detect a plurality of distinct levels of the sensing signal, corresponding to the number of the sensing zones filled with fluid. The signal transition from one level to another indicates a fluid flow that fills more or less number of the sensing zones. In an embodiment, each sensor has a plurality of sensing zones along the channel width, and can detect a plurality of distinct levels of the sensing signal, which correspond to the number of the sensing zones filled with fluid. In an embodiment, the signal level is measured to determine the volume ratio of gas bubbles in a fluid flow.

As further disclosed herein, various embodiments may be used to measure the volume of a fluid plug, and volume displacement, flow rate and flow velocity of a fluid moving along the sensing channel. In another embodiment, particular arrangements of sensing zones may be used to improve the resolution of volume sensing beyond the geometry limitation of the fluidic channel. In another embodiment, the present disclosure provides measurements of the volume ratio of gas bubbles in a fluid sample.

In an embodiment, the geometry of the sensing zones is optimized to increase the alignment tolerance between the sensor and the fluidic channel. In an embodiment, the sensing zones can have a width that is slightly larger then the channel width interacting with the sensing zones, so as to increase alignment tolerance along the channel width direction. For example, the sensing zone width can be 200% of the channel width, which has an alignment tolerance of ±50% of the channel width. In other embodiments, the sensing zone width can be in the range of 100% to 300% of the channel width, or 300% to 500% of the channel width. In another embodiment, the geometry of the fluidic channel is optimized to minimize the area of the sensor that is required to include the sensing zones. For example, in an embodiment of a sensor with multiple sensing zones, the channel geometry can have a meander shape to minimize the sensor area.

In an embodiment, the present disclosure may be modified to provide various sensing signals. For example, while not limited to any particular example, there are may various physical signals that could be used in sensing signals. For example, physical signals may include optical signals, electrical signals, acoustic signals, and/or thermal signals. In an embodiment, there may be further structural modifications, including for example an embodiment wherein the fluidic channel is an integrated component of a cartridge while the sensors are external components separated from the cartridges. Or, for example, an embodiment wherein both the fluidic channel and the sensors are integrated components of the cartridges.

The present disclosure is also directed to a kit for determining fluid volume. The kit is useful for practicing method described herein of analyzing a biological sample, for example. The kit is an assemblage of materials or components, including at least one of the compositions described herein. Thus, in some embodiments the kit contains a composition including solution and media.

The exact nature of the components configured in the inventive kit depends on its intended purpose. For example, some embodiments are configured for the purpose of diagnosing a disease or condition, or as part of an overall treatment regimen. In one embodiment, the kit is configured particularly for the purpose of diagnosing mammalian subjects. In another embodiment, the kit is configured particularly for the purpose of diagnosing human subjects. In further embodiments, the kit is configured for veterinary applications, diagnosing or treating subjects such as, but not limited to, farm animals, domestic animals, and laboratory animals.

Instructions for use may be included in the kit. "Instructions for use" typically include a tangible expression describing the technique to be employed in using the components of the kit to effect a desired outcome, such as to analyze a biological sample. Optionally, the kit also contains other useful components, such as, diluents, buffers, pharmaceutically acceptable carriers, syringes, catheters, applicators, pipetting or measuring tools, bandaging materials or other useful paraphernalia as will be readily recognized by those of skill in the art.

The materials or components assembled in the kit can be provided to the practitioner stored in any convenient and suitable ways that preserve their operability and utility. For example, the components can be in dissolved, dehydrated, or lyophilized form; they can be provided at room, refrigerated or frozen temperatures. The components are typically contained in suitable packaging material(s). As employed herein, the phrase "packaging material" refers to one or more physical structures used to house the contents of the kit, such as inventive compositions and the like. The packaging material is constructed by well known methods, preferably to provide a sterile, contaminant-free environment. As used herein, the term "package" refers to a suitable solid matrix or material such as glass, plastic, paper, foil, and the like, capable of holding the individual kit components. Thus, for example, a package can be a glass vial used to contain suitable quantities of an inventive composition containing solution or media. The packaging material generally has an external label which indicates the contents and/or purpose of the kit and/or its components.

The various methods and techniques described above provide a number of ways to carry out the disclosure. Of course, it is to be understood that not necessarily all objectives or advantages described may be achieved in accordance with any particular embodiment described herein. Thus, for example, those skilled in the art will recognize that the methods described herein can be performed in a manner that achieves or optimizes one advantage or group of advantages as taught herein without necessarily achieving other objectives or advantages as may be taught or suggested herein. Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein.

Although the disclosure has been disclosed in the context of certain embodiments and examples, it will be understood by those skilled in the art that the embodiments of the present disclosure extend beyond the specifically disclosed embodiments to other alternative embodiments and/or uses and modifications and equivalents thereof.

Many variations and alternative elements have been disclosed in embodiments of the present disclosure. Still further variations and alternate elements will be apparent to one of skill in the art. Among these variations, without limitation, are the selection of constituent modules for the compositions described herein, and the diseases and other clinical conditions that may be diagnosed, prognosed or treated therewith.

In some embodiments, the numbers expressing quantities of ingredients, properties such as concentration, reaction conditions, and so forth, used to describe and claim certain embodiments of the disclosure are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable. The numerical values presented in some embodiments of the disclosure may contain certain errors necessarily resulting from the standard deviation found in their respective testing measurements.

In some embodiments, the terms "a" and "an" and "the" and similar references used in the context of describing a particular embodiment of the disclosure (especially in the context of certain of the following claims) can be construed to cover both the singular and the plural forms. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of the present disclosure are described herein, including the best mode known for carrying out the disclosure. Variations on those preferred embodiments will become apparent to those of ordinary skill in the art upon reading the foregoing description. It is contemplated that skilled artisans can employ such variations as appropriate, and the disclosure can be practiced otherwise than specifically described herein. Accordingly, many embodiments of this disclosure include all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Furthermore, numerous references have been made to patents and printed publications throughout this specification. Each of the above cited references and printed publications are herein individually incorporated by reference in their entirety.

It is to be understood that the embodiments of the disclosure disclosed herein are illustrative of the principles of the present disclosure. Other modifications that can be employed can be within the scope of the disclosure. Thus, by way of example, but not of limitation, alternative configurations of the present disclosure can be utilized in accordance with the teachings herein. Accordingly, embodiments of the present disclosure are not limited to that precisely as shown and described.

The following examples are provided to better illustrate the claimed disclosure and are not to be interpreted as limiting the scope of the disclosure. To the extent that specific materials are mentioned, it is merely for purposes of illustration and is not intended to limit the disclosure. One skilled in the art may develop equivalent means or reactants without the exercise of inventive capacity and without departing from the scope of the disclosure.

In one embodiment, a sensing device 10 according to the present disclosure comprises of a plurality of sensors 1001, 1002 ... and 100$n$ (n≥2), as shown in FIG. 1 herein, which are positioned along the length of a fluidic channel 1000. Each sensor 1001, 1002, 100$n$ detects whether there is fluid in the overlapping area of the fluidic channel 1000. When a fluid enters the fluidic channel 1000, the sensors 1001, 1002, 100$n$ measure the length of the channel that is filled with the fluid. The fluid volume can then be determined based on the measured length and the known geometry of the fluidic channel 1000.

For a given volume of fluid, the narrower the cross-section of the fluidic channel 1000, the longer the length of the fluid-filled fluidic channel 1000 for measurement. Therefore, it is preferable for fluidic channel 1000 of sensing device 10 to have a narrow cross-section, so that a high accuracy and high resolution sensing of a small volume can be achieved. In an embodiment, a sensor 1001, 1002, 100$n$ can detect the time points when a fluid enters the overlapping areas of the fluidic channel 1000. By measuring time points, flow rate and flow velocity of the fluid, for example, can be determined with the known channel geometry. In preferred embodiments, sensing device 10 can be used to measure a fluid volume in the range of 1 nL to 1 mL. Sensing device 10 is preferably used in a cartridge for analysis of fluid samples.

Figure 2:
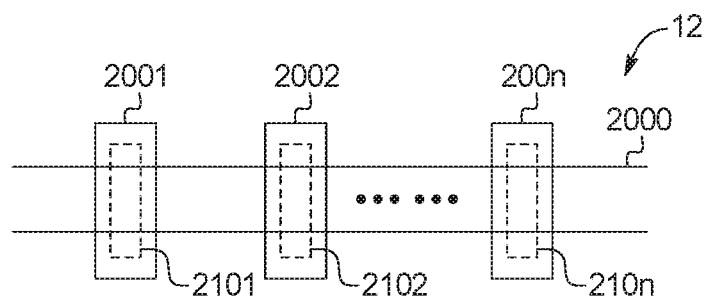
FIG. 2 depicts, in accordance with embodiments herein, an example embodiment of a sensing device.

In some embodiments, each sensor 1001, 1002, 1000$n$ of sensing device 10 has one sensing zone that detects the fluid in the channel. FIG. 2 herein shows an example of a sensing device 12 with a plurality of sensors 2001, 2002 ... and 200$n$, each with a respective sensing zone 2101, 2102 ... and 210$n$. In the illustrated embodiment, the sensing zone 2101, 2102, 210$n$ overlaps the entire width of fluid channel 2000 to detect any fluid that flows through fluid channel 2000. Alternatively, any one or more of sensing zone 2101, 2102, 210$n$ can overlap a portion of fluid channel 2000, for example, a top portion or a bottom portion.

Figure 3A:
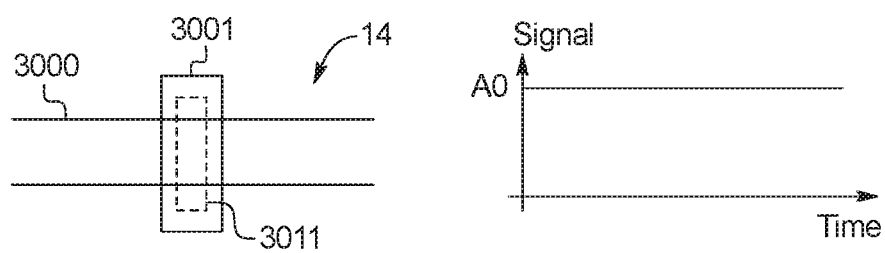
FIGS. 3A to 3D depict, in accordance with embodiments herein, an example embodiment of a sensing device.
Figure 3B:
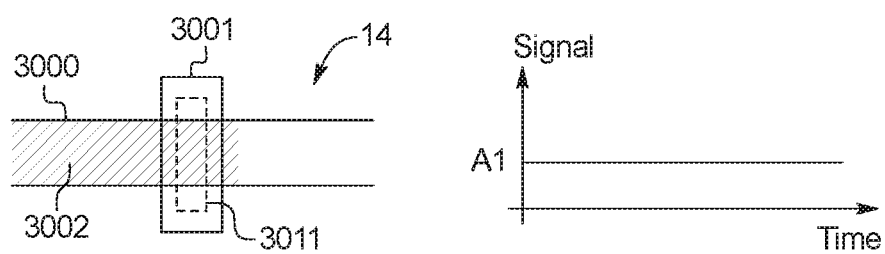
Figure 3C:
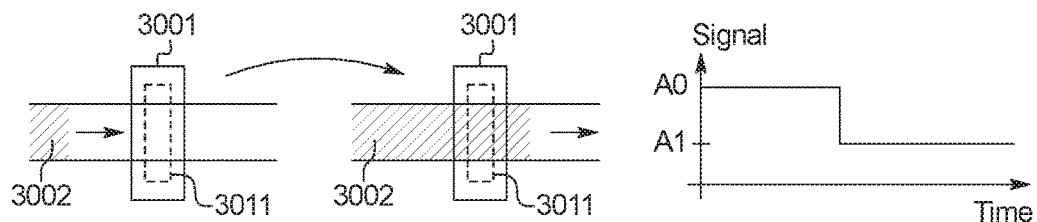
Figure 3D:
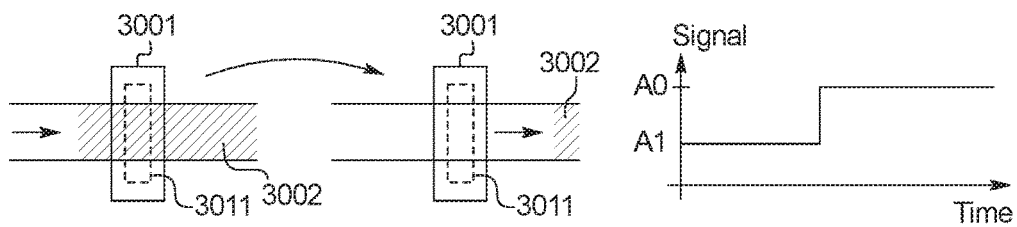

An example of the operation of a sensor 3001 is shown in FIGS. 3A to 3D. As illustrated, sensor 3001 of sensing device 14 has a sensing zone 3011 that overlaps a fluid channel 3000 of a disposable cassette. When there is no fluid in the sensing zone 3011, sensor 3001 detects one signal level $A_0$, as shown in FIG. 3A. When sensing zone 3011 is filled with fluid 3002, sensor 3001 detects another signal level $A_1$ ($A_0 \neq A_1$), as shown in FIG. 3B. In this way, sensor 3001 measures a signal step of $A_0 \rightarrow A_1$ when a fluid flows into sensing zone 3011 (FIG. 3C), and measures a signal step of $A_1 \rightarrow A_0$ when a fluid flow out of sensing zone 3011 (FIG. 3D).

Figure 4A:
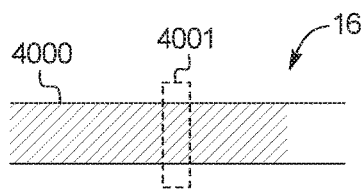
FIGS. 4A to 4D depict, in accordance with embodiments herein, an example embodiment of a sensing device.
Figure 4B:
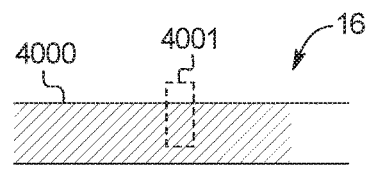
Figure 4C:
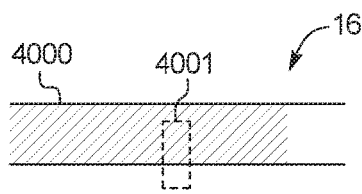
Figure 4D:
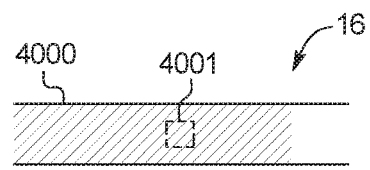

In various embodiments, a sensing zone may overlap different portions of the channel width. FIGS. 4A to 4D illustrate four examples, where sensing zone 4001 of sensing device 16 overlaps either the full width (FIG. 4A) or a partial width (FIGS. 4B-4D) of the channel. FIGS. 4B to D show that sensing zones smaller than the channel width can also be used for this method.

Figure 5A:
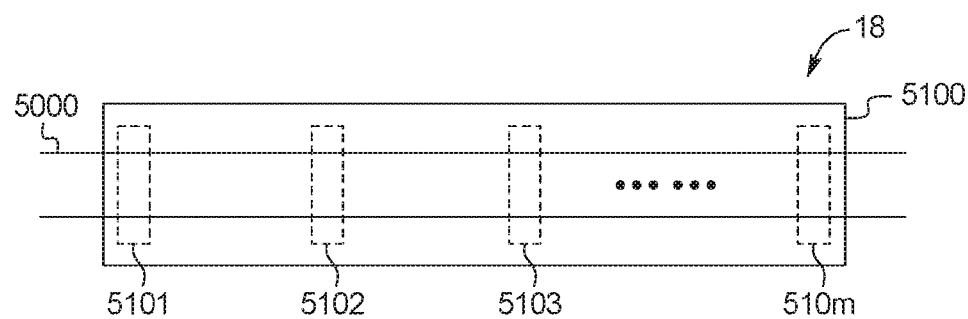
FIGS. 5A to 5I depict, in accordance with embodiments herein, an example embodiment of a sensing device.
Figure 5B:
Figure 5C:
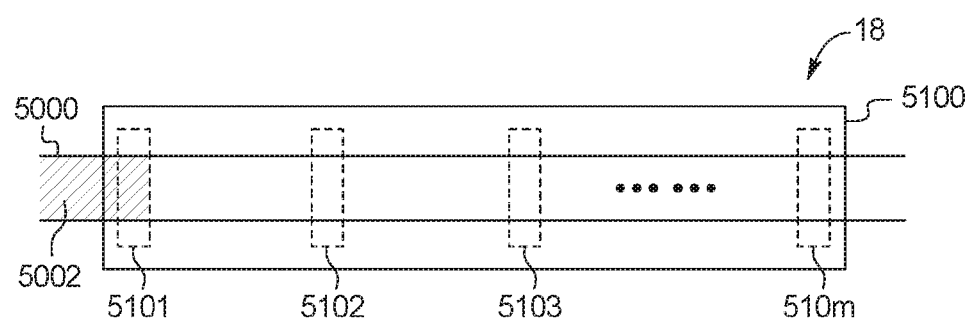
Figure 5D:
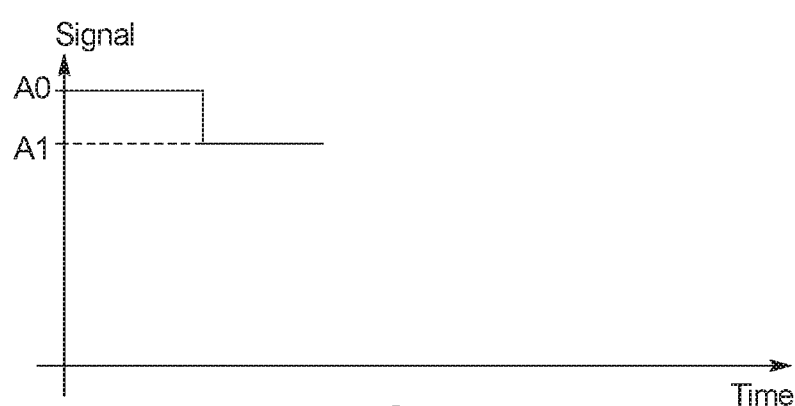
Figure 5E:
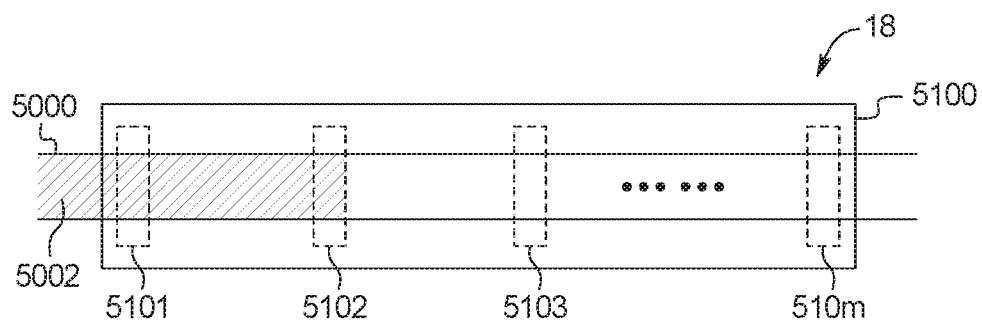
Figure 5F:
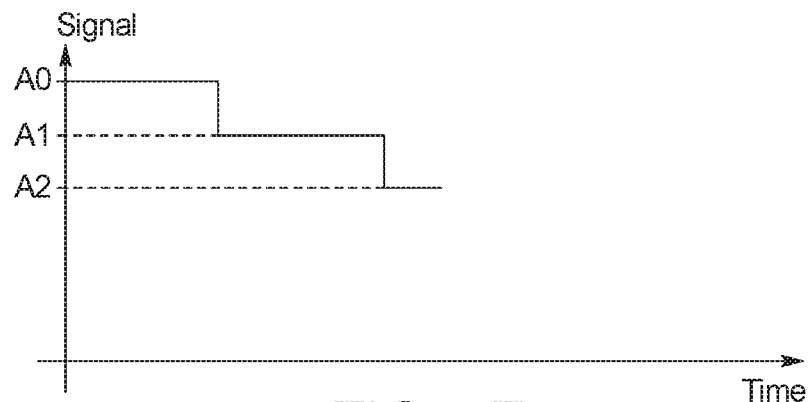
Figure 5G:
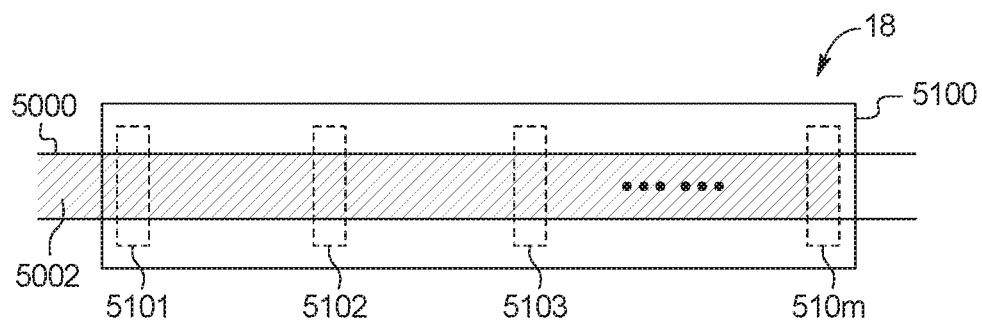
Figure 5H:
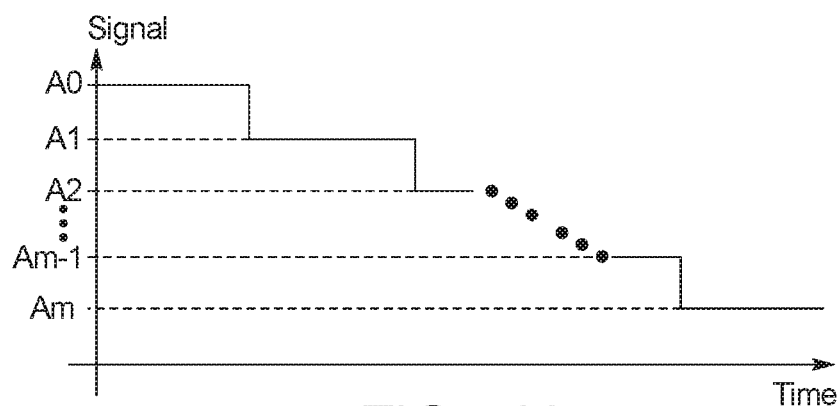
Figure 5I:
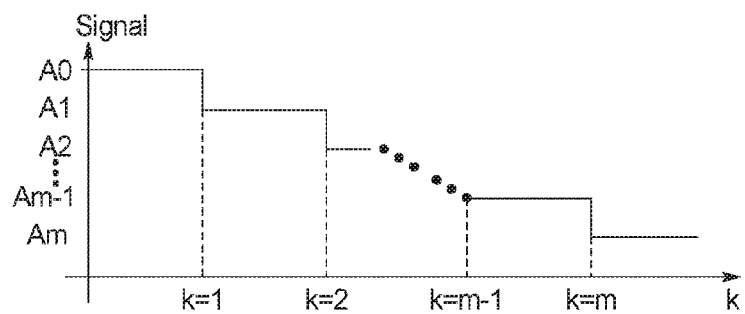

In other embodiments, each sensor of the sensing device can have a plurality of sensing zones along the length of the channel, as shown FIGS. 5A to 5I. In FIG. 5A, one sensor 5100 of sensing device 18 has a plurality of m sensing zones, 5101, 5102 . . . and 510m (m≥2) along the length of the fluid channel 5000 (FIG. 5A). Sensor 5100 detects a signal level $A_0$ when there is no fluid in the sensing zones (FIG. 5B). When a fluid sample 5002 enters the channel and fills up the first sensing zone 5101 (FIG. 5C), the sensor 5100 measures a signal $A_1$ (FIG. 5D) that is distinctive from $A_0$. When the fluid sample 5002 continuously enters the channel and filter up both sensing zones 5101 and sensing zones 5102 (FIG. 5E), the sensor 5100 measures a signal level $A_2$ (FIG. 5F). When the fluid sample 5002 continuously enters the channel and fills up sensing zones 5101 to sensing zones 510m (FIG. 5G), the sensor 5100 measures a signal level $A_m$ (FIG. 5H). In general, the sensor detects a signal level $A_k$ when there is fluid in k sensing zones (0≤k≤m), where signal levels $A_k$ are distinct from each other for k=0, 1, 2, . . . , m (FIG. 5I). The intensity of the sensing signal can be used to determine how many sensing zones are detecting fluid. This design can be achieved, for one example, by using a sensing signal that is proportional to the number of the sensing zones detecting fluid.

The disclosed sensing device can measure a signal step of $A_i \rightarrow A_j$, when a fluid flows in the channel and changes from filling i sensing zones to filling j sensing zones (0≤i≠j≤m). For example, sensor 5100 measures a signal step of $A_2 \rightarrow A_3$ when a fluid flows in the channel and changes from filling two sensing zones flows to filling three sensing zones. In another example, sensor 5100 measures a signal step of $A_3 \rightarrow A_2$ when fluid flows in the channel and changes from filling three sensing zones flows to filling two sensing zones For certain applications, the design of one sensor with a plurality of sensing zones can be advantageous in comparison to the design of multiple sensors that each has one sensing zone. For example, to cover the measurement of ten sensing zones along the channel length, one design is to use a sensor with ten sensing zones, as compared to a design using ten sensors each having one sensing zone. The design of one sensor with a plurality of sensing zones has the advantages of simplified sensing hardware. This advantage is further elaborated in the example of FIG. 17 as discussed in below.

In an embodiment, the fluid channel has a channel width between 1 μm and 1 mm, a channel depth between 1 μm and 1 mm, and a channel length between 100 μm and 100 mm. For these examples, the maximum volume of the sensing device is in the range from 100 fL to 100 μL. For yet other examples, the fluid channel has a channel width between 0.01 μm and 1 μm, a channel depth between 0.01 μm and 1 μm, and a channel length between 1 μm and 100 μm. For these examples, the maximum volume of the sensing device is in the range from 0.0001 fL to 100 fL. For yet other examples, the fluid channel has a channel width between 1 mm and 10 mm, a channel depth between 1 mm and 10 mm, and a channel length between 100 mm and 1,000 mm. For these examples, the maximum volume of the sensing device is in the range from 100 μL to 100 mL. In an embodiment, the channel width can be from about 0.001 mm to about 0.05 mm, about 0.05 mm to about 1 mm, or about 1 mm to about 5 mm, and the channel height can be from about 0.001 mm to about 0.01 mm, about 0.01 mm to about 0.5 mm, about 0.5 um to about 1 mm, or about 1 mm to about 2 mm.

Figure 6A:
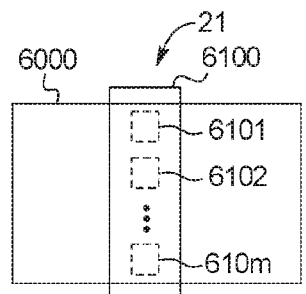
FIGS. 6A and 6B depict, in accordance with embodiments herein, an example embodiment of a sensing device.
Figure 6B:
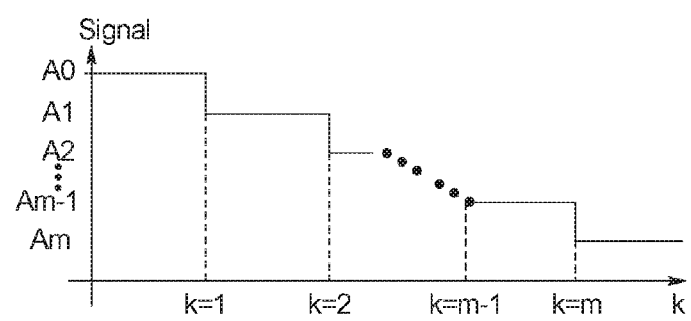

In another embodiment, each sensor of the sensing device can have a plurality of sensing zones along the width of the channel, as shown FIGS. 6A and 6B. In FIG. 6A, sensor 6100 of sensing device 20 has a plurality of m sensing zones, 6101, 6102 . . . and 610m (m≥2) along the width of fluid channel 6000. Similar to the example of FIG. 5, sensor 6100 detects a signal level $A_0$ when there is no fluid in the sensing zones, and detects a signal level $A_k$ when there is fluid in k sensing zones (0≤k≤m). Signal levels $A_k$ are distinct from each other for k=0, 1, 2, . . . m (FIG. 6B). With this configuration, the sensor's signal level can measure the ratio of the channel width that is filled with fluid versus the width that is not, e.g. the width occupied by gas bubbles, as shown in the example of FIG. 15 as discussed below.

In an embodiment, one or more of the above-described sensors can be added to a fluidic cartridge or device for accepting a fluidic cartridge. Each sensor can be electrically connected to a control unit, which can then control fluid flow and/or provide user feedback based on signals from the sensors. The control unit can, for example, by determining the presence or absence of fluid at each fluid sensing zone, determine parameters of a particular fluid sample and control pumps and valves to stop fluid flow and/or run a test on the fluid sample when an appropriate amount of fluid has been transferred through the flow channel. The specific parameters determined by the control unit are discussed in more detail below.

Fluid Volume Measurement

Figure 7A:
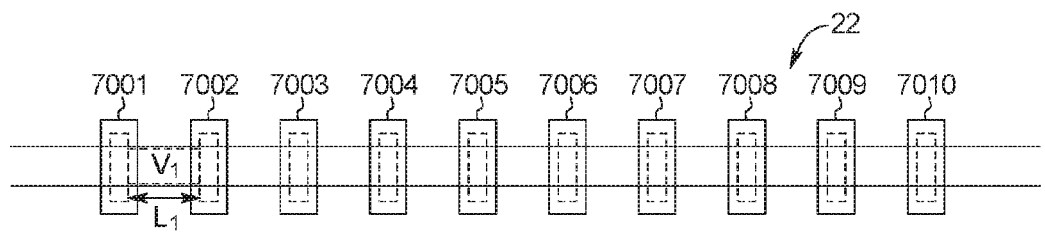
FIGS. 7A to 7F depict, in accordance with embodiments herein, an example embodiment of a sensing device.
Figure 7B:
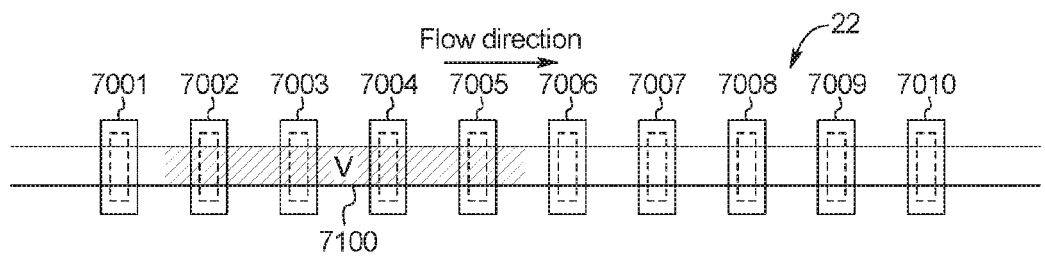
Figure 7C:
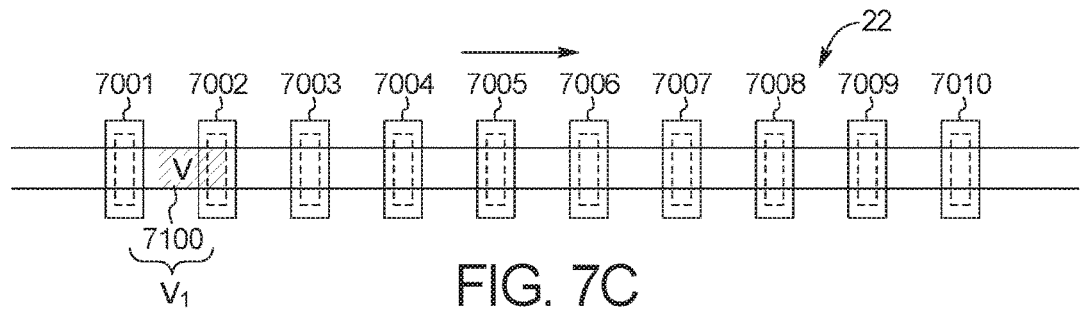
Figure 7D:
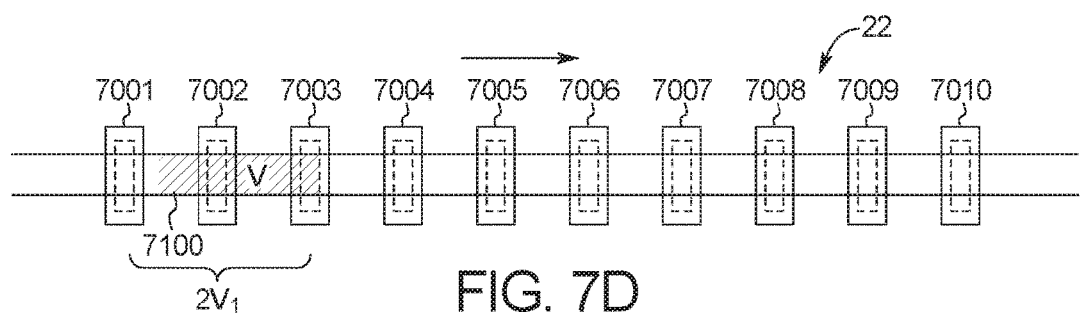
Figure 7E:
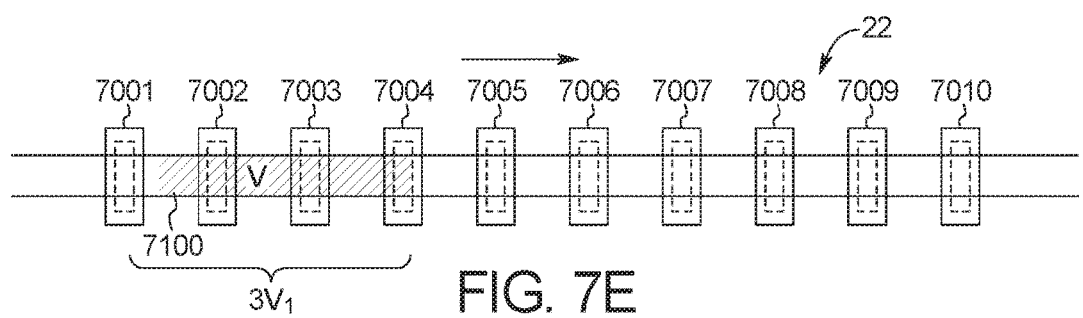

Particular embodiments of the sensing devices described herein can be used to measure the volume of a fluid plug. FIGS. 7A to 7F show examples of these embodiments, which include a sensing device 22 with a plurality of ten sensors 7001, 7002 . . . 7010 that each has one sensing zone. As shown in FIG. 7A, the channel length between any of the two neighboring sensors is $L_1$, and the channel volume between any of the two neighboring sensors is $V_1$. A fluid plug 7100 with volume V (V>0) is flowing into the fluid channel 7000 (along the indicated direction) for volume measurement, as shown in FIG. 7B.

Scenario 1: $0<V<V_1$. As the fluid plug flows through the channel (FIG. 7C), the sensor 7002 and sensor 7001 cannot detect fluid simultaneously. This is because of the volume of the fluid plug ($V<V_1$) is less than the channel volume between the sensors 7001 and 7002 ($V_1$).

Scenario 2: $V_1 \leq V<2V_1$. As the fluid plug flows through the channel (FIG. 7D), the sensor 7002 and sensor 7001 can detect fluid simultaneously, but sensor 7003 and sensor 7001 can not detect fluid simultaneously.

Scenario 3: $2V_1 \leq V<3V_1$. As the fluid plug flows through the channel (FIG. 7E), the sensor 7003, sensor 7002 and sensor 7001 can detect fluid simultaneously, but sensor 7004 and sensor 7001 can not detect fluid simultaneously In general, for the scenario of $(N-1)V_1 \leq V<NV_1$ (N=2, 3, 4, . . . 9), as the fluid plug flows through the channel, sensor 700N, 700(N−1) . . . and sensor 7001 can detect fluid simultaneously, but sensor 700(N+1) and sensor 7001 cannot detect fluid simultaneously.

Figure 7F:
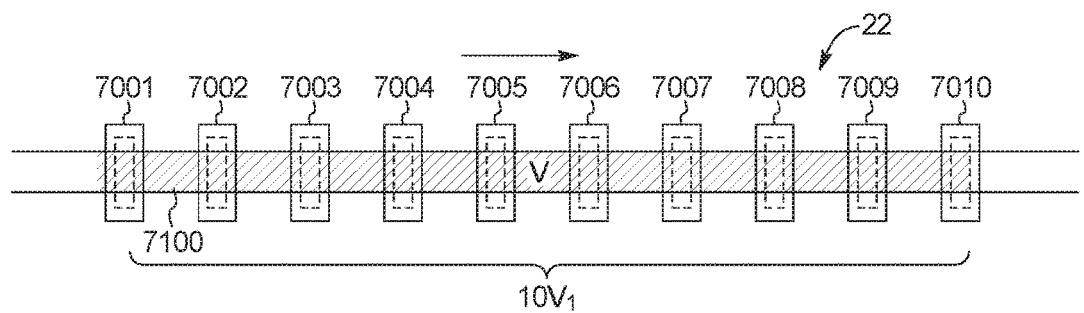

In the scenario $V \geq 10V_1$, as the fluid plug flows through the channel, sensor 7010, 7009, . . . and 7001 can all detect fluid simultaneously (FIG. 7F).

By monitoring the sensing signal of the sensors, sensing device 22 can measure the volume of a fluid plug in the range of 0 to $10V_1$ with a resolution of $V_1$.

Sensing device 22 can also be operated in other ways that would be understood by persons skilled in the art based on the present disclosure. For example, fluid plug can flow in a direction reserve to the direction shown in FIG. 7. By increasing the number of sensors, the measureable volume range of the sensing device can be increased. For example, sensing device 22 can measure a volume range from 0 to $100V_1$ by using 100 sensors along the channel. By decreasing the channel volume $V_1$ between the neighboring sensors, the measurement resolution can be increased. For example, by decreasing the neighboring volume from $V_1$ to $0.5V_1$, the measurement resolution can be increased to $0.5V_1$.

Figure 8A:
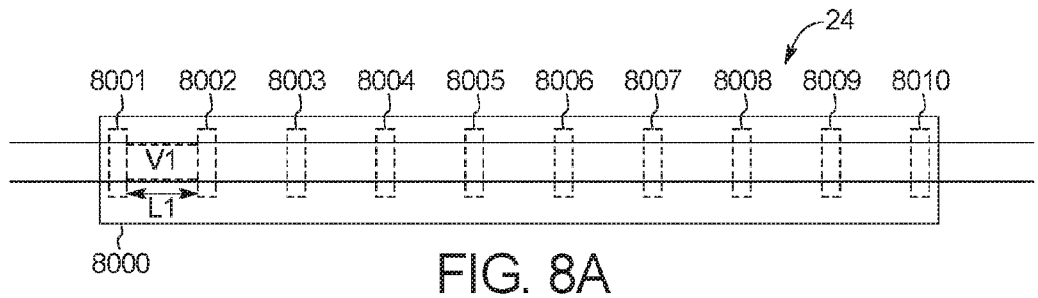
FIGS. 8A and 8B depict, in accordance with embodiments herein, an example embodiment of a sensing device.
Figure 8B:
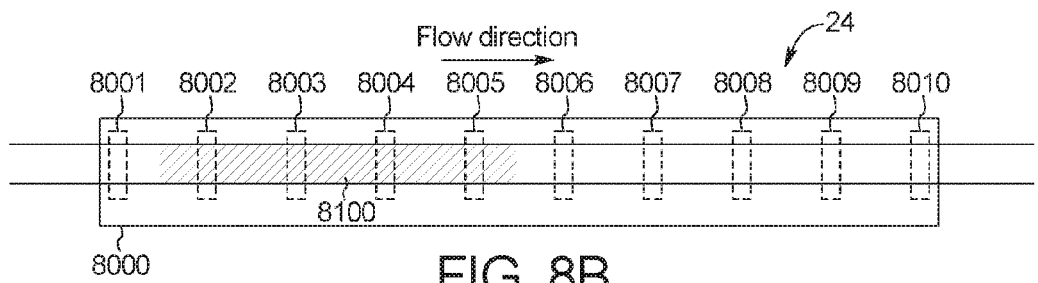

In the illustrated embodiment, sensing device 22 uses 10 individual sensors that each has 1 sensing zone. Similar sensing function can be achieved by an alternative sensing device 24 that uses 1 sensor 8000 with 10 sensing zones 8001, 8002, . . . and 8010, as shown in FIGS. 8A and 8B. Sensing device 24 measures the volume of a fluid plug by monitoring the number of sensing zones filled with fluid, as shown in FIG. 8B.

Figure 9A:
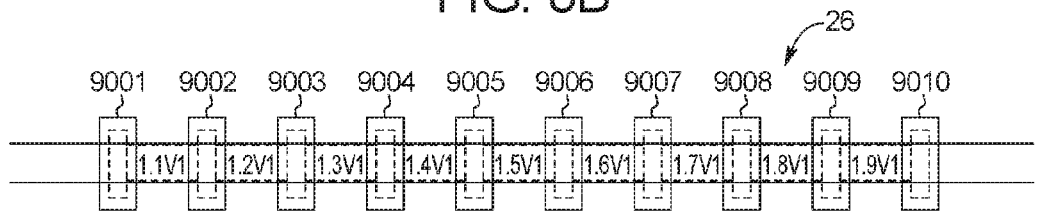
FIGS. 9A to 9E depict, in accordance with embodiments herein, an example embodiment of a sensing device.
Figure 9B:
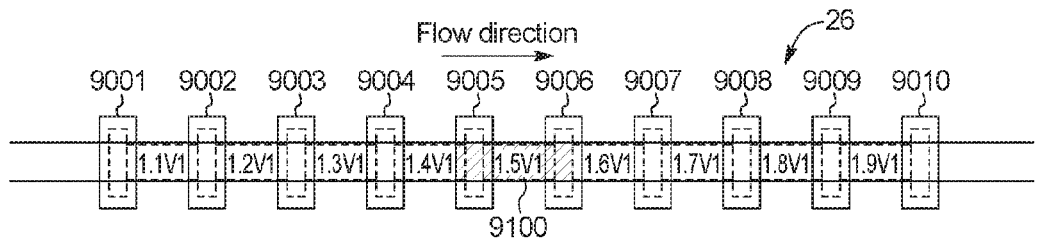
Figure 9C:
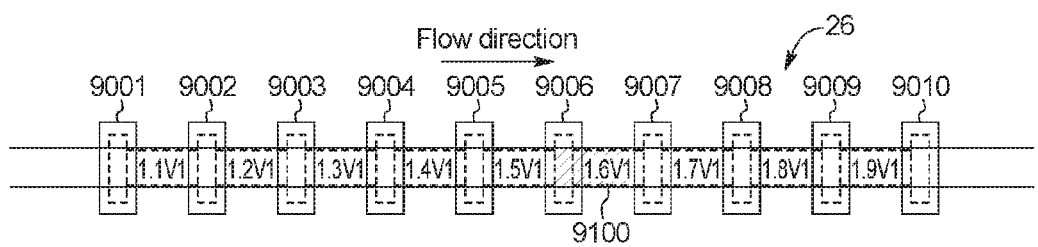
Figure 9D:
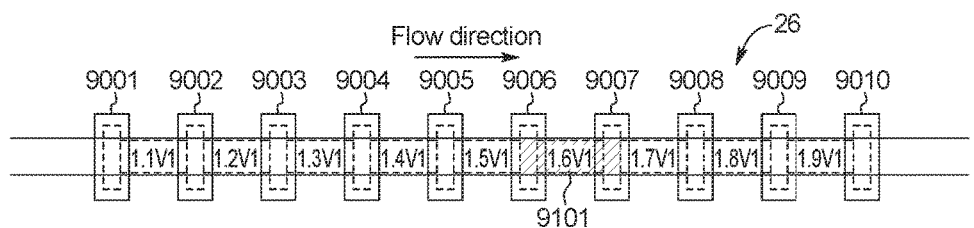
Figure 9E:
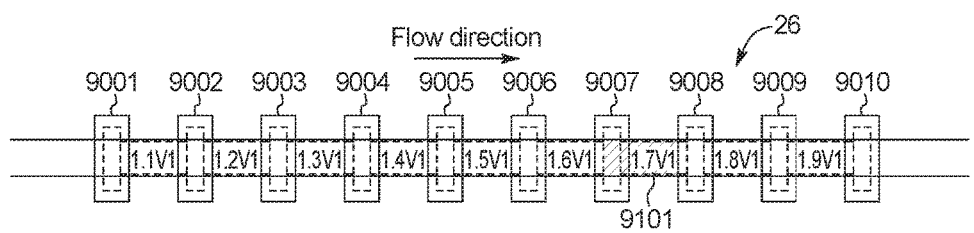

In the above two examples, the resolution of the volume measurement is limited to the volume $V_1$ between two neighboring sensors or sensing zones. Particular embodiments of the sensing design are also taught in this disclosure to increase resolution. FIG. 9A shows one example of these embodiments. Sensing device 26 comprises a plurality of 10 sensors 9001, 9002, . . . and 9010. The volume between two neighboring sensors is designed to be incremental as $1.1V_1$, $1.2V_1$, $1.3V_1$ . . . and $1.9V_1$. When a fluid plug 9100 with a volume $1.5V_1$ flows into the channel, sensor 9005 and sensor 9006 can detect fluid simultaneously (FIG. 9B) whereas sensors 9006 and 9007 cannot detect fluid simultaneously (FIG. 9C). When a fluid plug 9101 with a volume 1.6 V1 flows into the channel, sensor 9006 and sensor 9007 can detect fluid simultaneously (FIG. 9D) whereas sensors 9007 and 9008 cannot detect fluid simultaneously (FIG. 9E). In this way, sensing device 26 can distinguish a fluid plug with a volume of $1.5V_1$ versus $1.6V_1$, achieving a measurement resolution of $0.1V_1$. This measurement resolution is smaller than the minimal volume between neighboring sensors ($1.1V_1$) in the sensing device 24.

Figure 10:
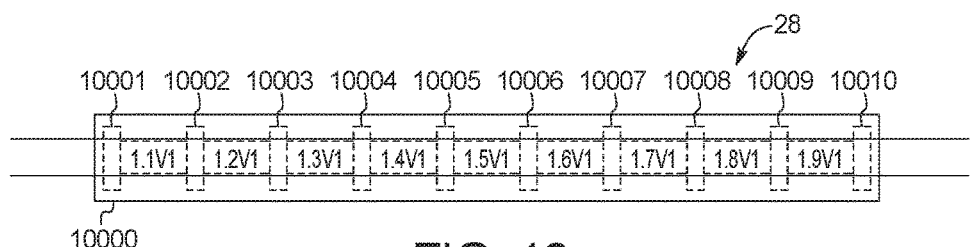
FIG. 10 depicts, in accordance with embodiments herein, an example embodiment of a sensing device.

Additionally, the sensing device above can measure a fluid plug volume with a resolution of $0.2V_1$, by considering two sensors that has one sensor in between, such as the sensors 9001 and 9003, as the "neighboring" sensors. Similarly, this sensing device can measure fluid plug volume with a resolution of $0.3V_1$, by considering two sensors that has two sensors in between, such as the sensors 9001 and 9004, as the "neighboring" sensors In further embodiments, sensing devices can include one sensor with a plurality of sensing zones. FIG. 10 shows one example of a sensing device 28 comprising one sensor 10000 with a plurality of ten sensing zones 10001, 10002 . . . and 10010. The channel volumes between the neighboring sensors are $1.1V_1$, $1.2V_1$ . . . and $1.9V_1$. Similar to the sensing device 26 in FIG. 9A, sensing device 28 also measures the volume range from $1.0V_1$ to $1.9V_1$ with a resolution of $0.1V_1$.

Figure 11A:
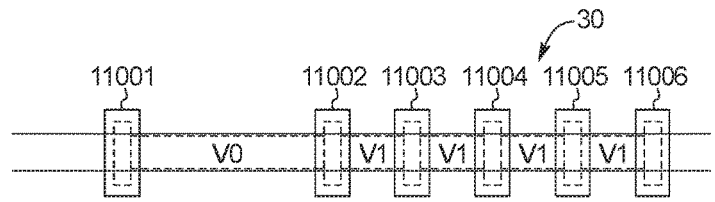
FIGS. 11A to 11D depict, in accordance with embodiments herein, an example embodiment of a sensing device.
Figure 11B:
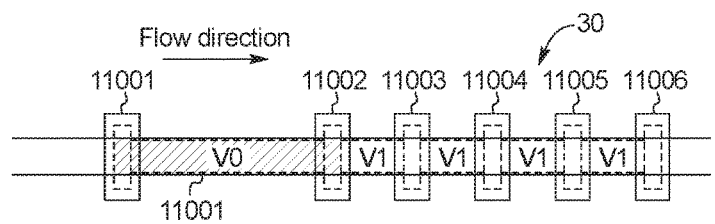
Figure 11C:
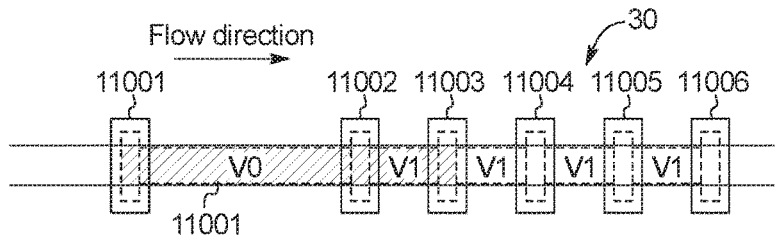
Figure 11D:
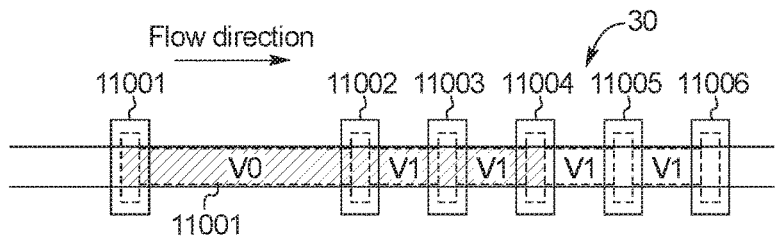

In the example of FIG. 7A, the maximum volume measureable on the sensing design 22 is $10V_1$, which is proportional to the number of sensors or the number of the sensing zones. To measure a larger volume, for example $100V_1$, a sensing device with a larger number of sensors or sensing zones will be needed, e.g., with 100 sensing zones. This configuration will significantly increase the hardware complexity. Particular embodiments can be used to increase the maximum volume, without using too many sensors and sensing zones. FIG. 11A shows one example of these embodiments. Sensing device 30 comprises of a plurality of 6 sensors along the channel length. Between the neighboring sensors 11001 and 11002, the channel volume is $V_0$. The channel volume between other neighboring sensors, e.g. sensor 11002 and 11003, is $V_1$ ($V_0 > V_1$). When a fluid plug with a volume of $V_0$ flows through the channel, sensors 11001 and 11002 can detect fluid simultaneously (FIG. 11B). When a fluid plug with a volume of $V_0+V_1$ flows through the channel, sensors 11001, 11002 and 11003 can detect fluid simultaneously (FIG. 11C). When a fluid plug with a volume of $V_0+2V_1$ flows through the channel, sensors 11001, 11002, 11003 and 11004 can detect fluid simultaneously (FIG. 11D). In this way, this sensing device design can measure a volume from $V_0$ to $V_0+4V_1$ with a measurement resolution of $V_1$.

Figure 12:
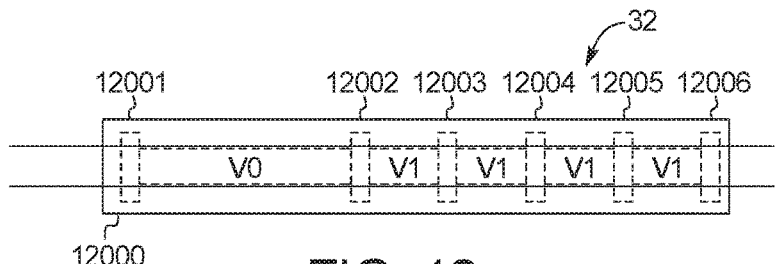
FIG. 12 depicts, in accordance with embodiments herein, an example embodiment of a sensing device.

Similarly, a sensing device 32 having one sensor with a plurality of six sensing zones 12001, 12002 . . . and 12006 can also measure the volume range from $V_0$ to $V_0+4V_1$ with the resolution of $V_1$, as show in FIG. 12. In this example embodiment, the channel volume between the sensing zones 12001 and 12002 is $V_0$, while the channel volume between other neighboring sensing zones is $V_1$.

In an embodiment, one or more of the above-described sensors can be added to a fluidic cartridge or device for accepting a fluidic cartridge. Each sensor can be electrically connected to a control unit, which can then control fluid flow and/or provide user feedback based on signals from the sensors. The control unit can, for example, by determining the presence or absence of fluid at each fluid sensing zone, determine the volume discussed above and control pumps and valves to stop fluid flow based on the determined volume.

Volume Displacement, Flow Rate, Flow Velocity

Figure 13A:
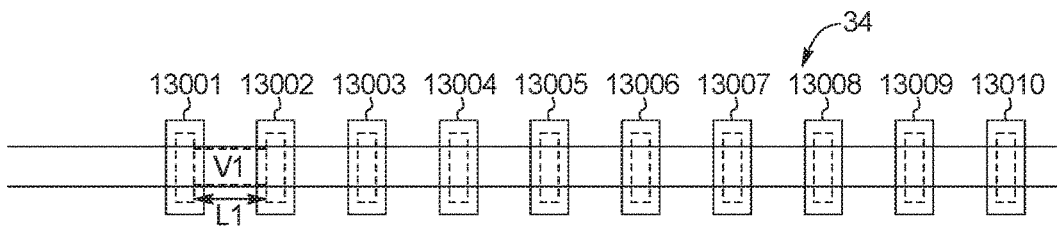
FIGS. 13A to 13D depict, in accordance with embodiments herein, an example embodiment of a sensing device.
Figure 13B:
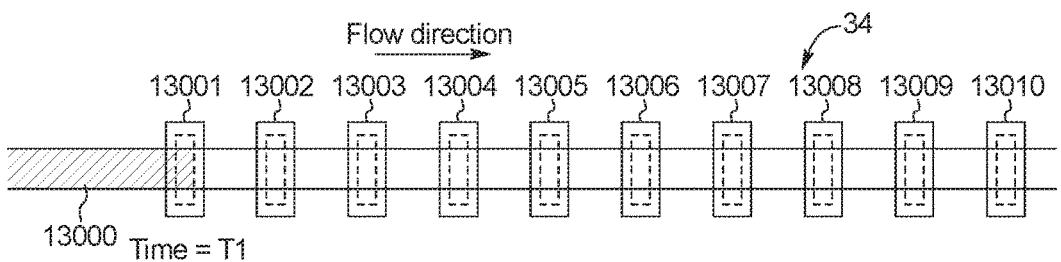
Figure 13C:
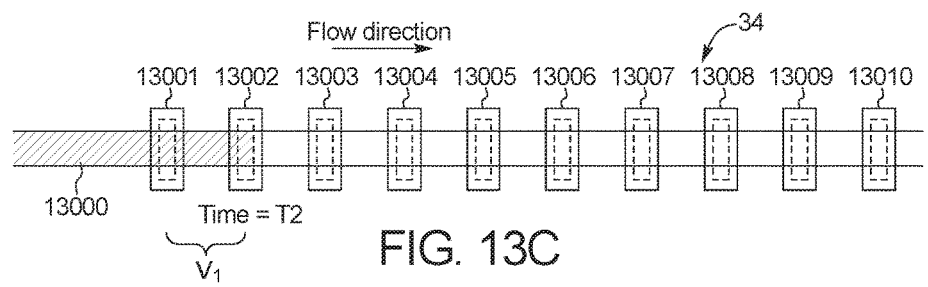
Figure 13D:
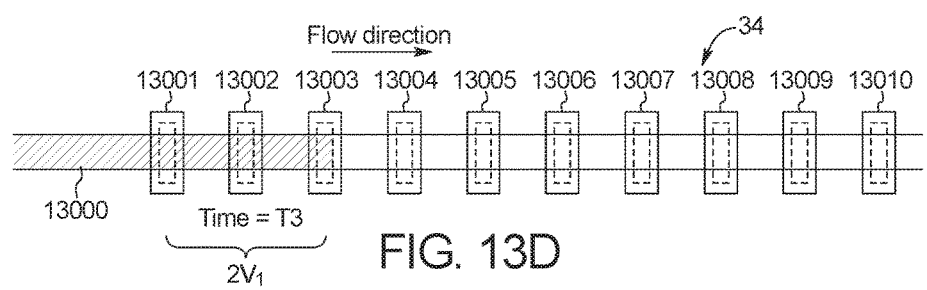

Particular embodiments of the sensing devices herein can be used to measure the volume displacement of a fluid flow. FIGS. 13A to 13C show one example of these embodiments, in which sensing device 34 comprises of a plurality of ten sensors 13001, 13002 . . . and 13010 along the channel length, and each sensor has one sensing zone. The channel length between two neighboring sensors is $L_1$, and the channel volume between two neighboring sensors is $V_1$ (FIG. 13). A continuous fluid 13000 flows through the channel for volume sensing as shown in FIG. 13B. Sensor 13001 detects the time point $T_1$ when the fluid flow reaches its sensing zone. Sensor 13002 detects the time point $T_2$ when the fluid flow reaches its sensing zone. From time $T_1$ to $T_2$, the volume displacement of the fluid flow is $V_1$, which is measured by the channel volume between sensors 13001 and 13002. Therefore, the average flow rate between time point $T_1$ and $T_2$ can be calculated as $Q_{T1\ to\ T2}=V_1/(T_2-T_1)$. Furthermore, if the fluid channel has a constant cross section area S, then the average flow velocity from $T_1$ to $T_2$ can be calculated as $v_{T1\ to\ TN}=Q_{T1\ to\ TN}/S$. In general, sensor 1300N (N=1, 2, 3, 4 . . . 10) detects the time point $T_N$ when the fluid flow reaches its sensing zone. From $T_1$ to $T_N$, the volume displacement of the fluid is $(N-1)V_1$, the average flow rate is $Q_{T1\ to\ TN}=(N-1)V_1/(T_N-T_1)$. The average flow velocity from $T_1$ to $T_N$ can be calculated as $v_{T1\ to\ TN}=Q_{T1\ to\ TN}/S$.

In other embodiments, sensing device 34 can comprise one sensor with a plurality of sensing zones to measure the fluid's volume displacement, flow rate and flow velocity.

Figure 14:
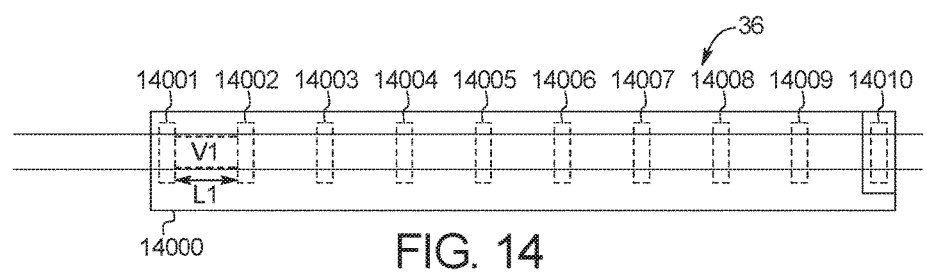
FIG. 14 depicts, in accordance with embodiments herein, an example embodiment of a sensing device.

FIG. 14 shows one example of these embodiments, in which sensing device 36 comprises one sensor 14000 that has a plurality of 10 sensing zones 14001, 14002 . . . and 14010 along the channel length. The channel length between two neighboring sensors is L1, and the channel volume between two neighboring sensors is V1. Sensing device 36 can make measurements in the same way described above for sensing device 34.

In an embodiment, one or more of the above-described sensors can be added to a fluidic cartridge or device for accepting a fluidic cartridge. Each sensor can be electrically connected to a control unit, which can then control fluid flow and/or provide user feedback based on signals from the sensors. The control unit can, for example, by determining the presence or absence of fluid at each fluid sensing zone, determine the volume displacement, flow rate and/or flow velocity discussed above and control pumps and valves to stop fluid flow and/or run a test on the fluid sample based on the determined volume displacement, flow rate and/or flow velocity. The controller can also note time points when the signals are taken and determine volume displacement, flow rate and/or flow velocity using the time points.

Bubble Measurement

Figure 15A:
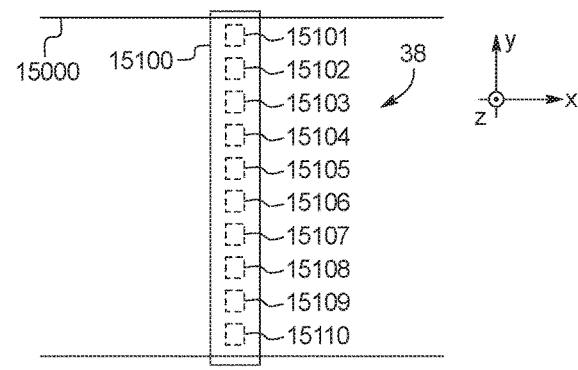
FIGS. 15A to 15C depict, in accordance with embodiments herein, an example embodiment of a sensing device.
Figure 15B:
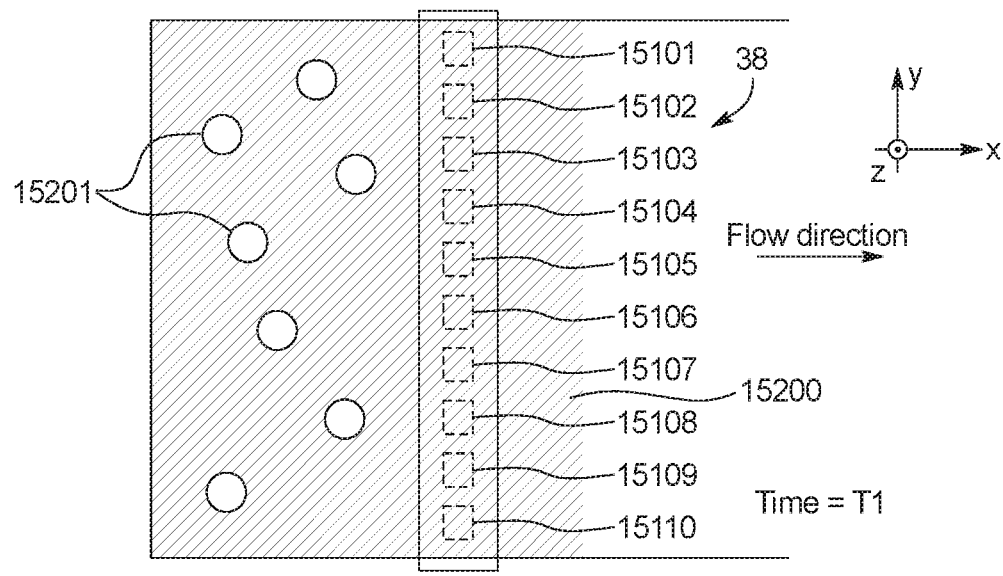
Figure 15C:
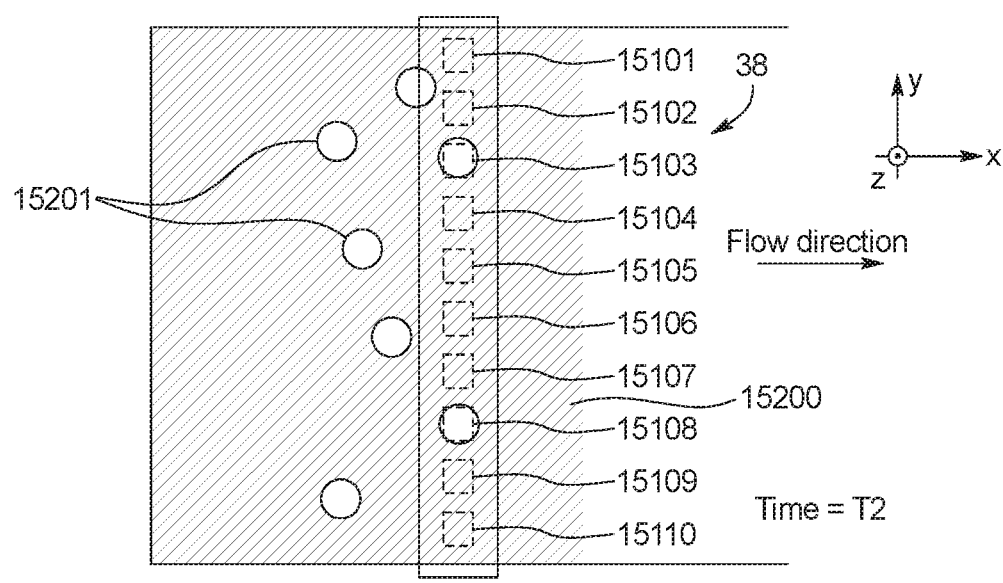

Particular embodiments of the sensing device can be used to determine the volume ratio of air bubbles mixed in a fluid. FIG. 15A shows one example embodiment, in which sensing device 38 comprises of one sensor 15100 with a plurality of 10 sensing zones 15101, 15102 . . . and 15110 along the width (y-axis) of fluid channel 15000. Each sensing zone has a same size and interacts with only one segment of the channel width, detecting whether the sensing zone is filled with air (no fluid) versus with fluid. The channel has a constant height along z-axis. Therefore, the number of sensing zones detecting gas $N_1$ can be used to estimate the bubble ratio as: bubble ratio $R_B = N_1/N$. N is the total number of the sensing zones and is equal to ten in this example.

For example, a fluid 15200 containing a plurality of air bubbles 15201 flows into the channel. At time $t=T_1$ (FIG. 15B), no sensing zone detects air in the channel ($N_1=0$). Therefore, the bubble ratio $R_B(t=T1)=0/10=0\%$. At time $t=T2$ (FIG. 15C), two sensing zones (15103, 15108) detects air in the channel (N1=2). Therefore, the bubble ratio $R_B(t=T2)=2/10=20\%$.

As the fluid continuously flows through the channel, the sensor continuously monitors the volume ratio of air bubble in the fluid. The accuracy of the volume ratio measurement can be increased using a larger number of the sensing zones along the channel width.

In an embodiment, one or more of the above-described sensors can be added to a fluidic cartridge or device for accepting a fluidic cartridge. Each sensor can be electrically connected to a control unit, which can then control fluid flow and/or provide user feedback based on signals from the sensors. The control unit can, for example, by determining the presence or absence of fluid at each fluid sensing zone, determine the bubble measurement discussed above and control pumps and valves to stop fluid flow and/or run a test on the fluid sample based on the determined bubble measurement.

Alignment Tolerance for Inserting Cartridge into Reader Instrument

Figure 16A:
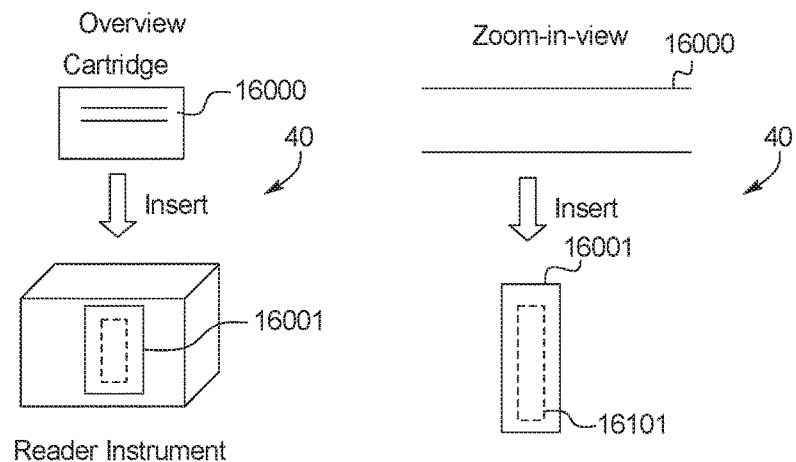
FIGS. 16A to 16J depict, in accordance with embodiments herein, an example embodiment of a sensing device.
Figure 16B:
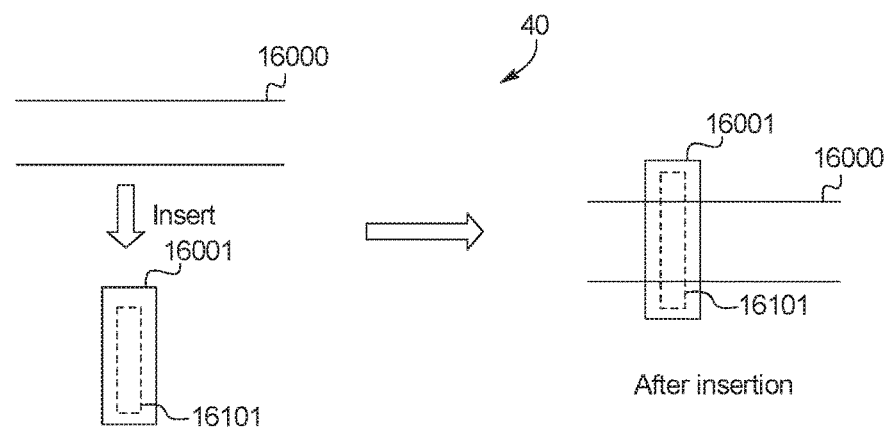

In particular embodiments, the geometry of the sensing zones and the fluid channels can be optimized for cartridge analysis. It is often desirable to insert disposable cartridges into a reader instrument for measurements. In an embodiment, a sensor 16001 of the sensing device 40 can be built into the reader instrument, whereas the fluid channel 16000 is located on the cartridge, as shown in FIG. 16A. Therefore, it is necessary to properly align the fluid channel 16000 with the sensor 16001 after insertion to achieve accurate sensing measurement, as shown in FIG. 16B. Tolerance of the alignment helps to improve repeatability of the sensing measurement.

Figure 16C:
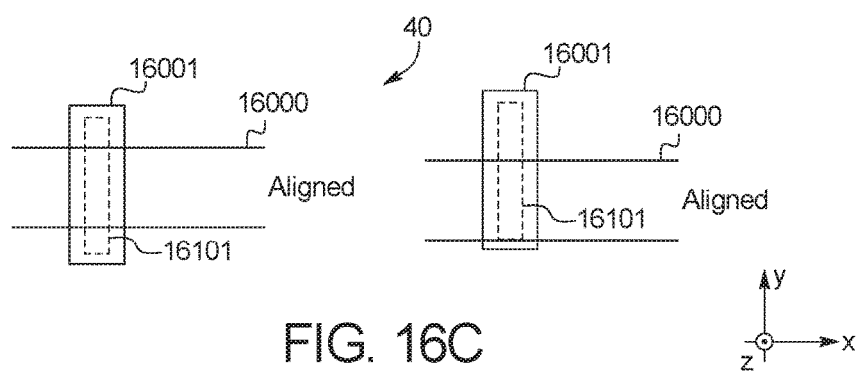
Figure 16D:
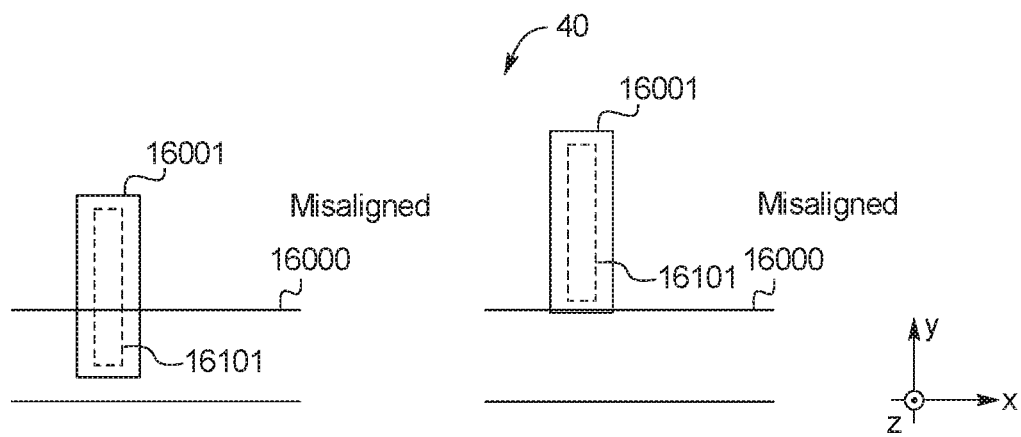
Figure 16E:
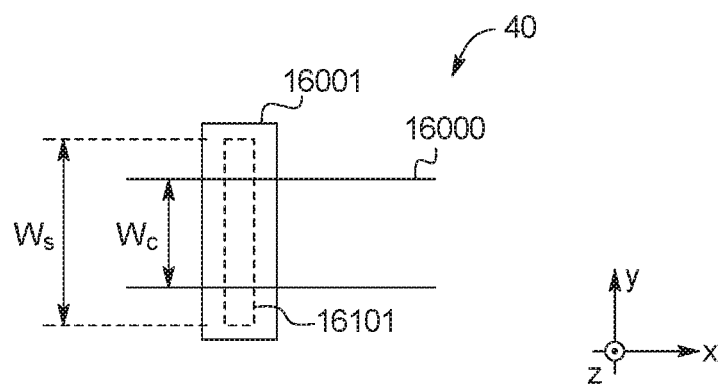
Figure 16F:
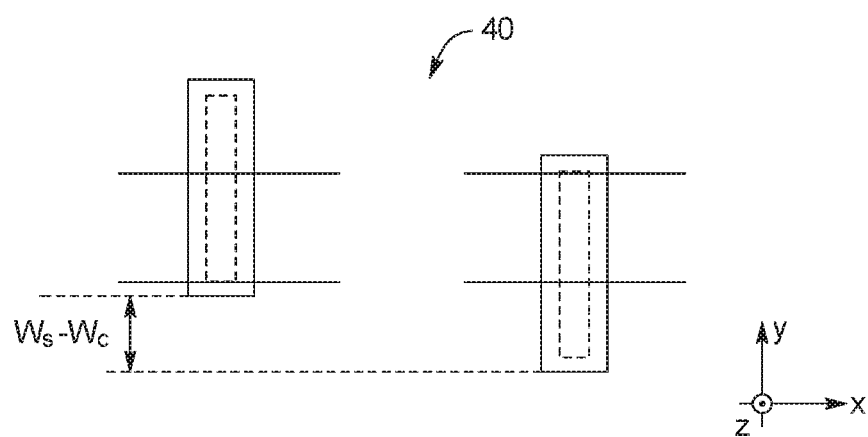

Two types of alignment tolerance are considered. The first type is the alignment tolerance along the channel width (y-axis). FIG. 16C and FIG. 16D show examples of aligned or misaligned sensing devices, depending on whether the sensing zone 16101 is covering the full width of the channel 16000. To increase alignment tolerance, the width of the sensing zone 16010 $W_S$ can be designed wider than the width of the fluid channel 16000 $W_C$, as shown in FIG. 16E. In this way, it can achieve an alignment tolerance of ($W_S-W_C$) in the width direction, as shown in FIG. 16F.

Figure 16G:
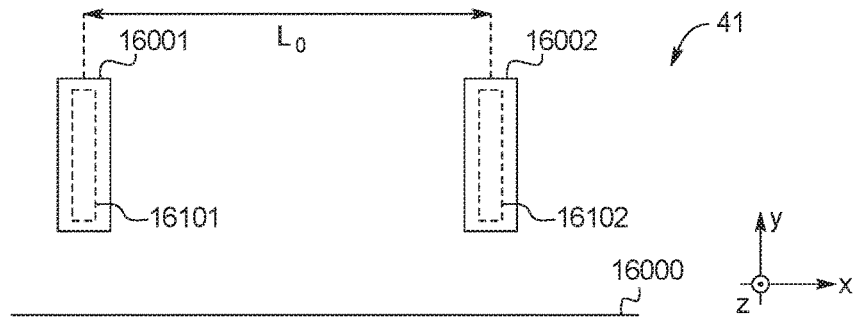
Figure 16H:
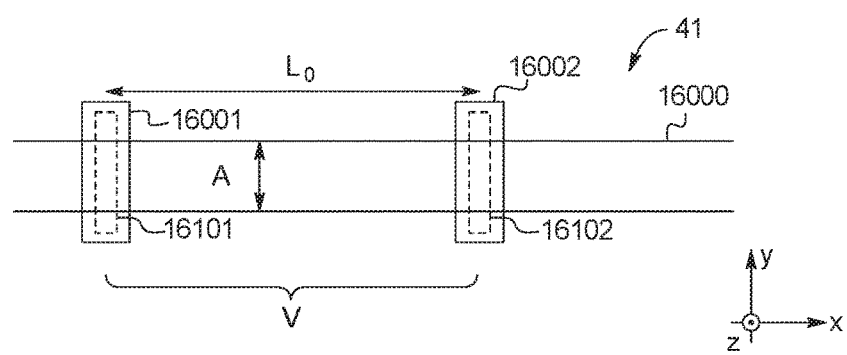
Figure 16H:
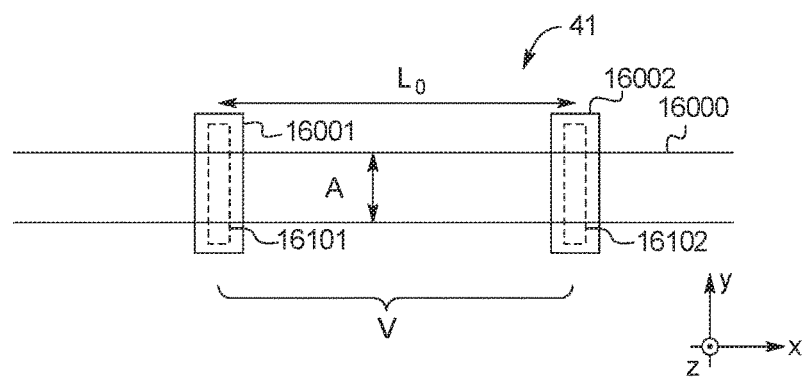
Figure 16I:
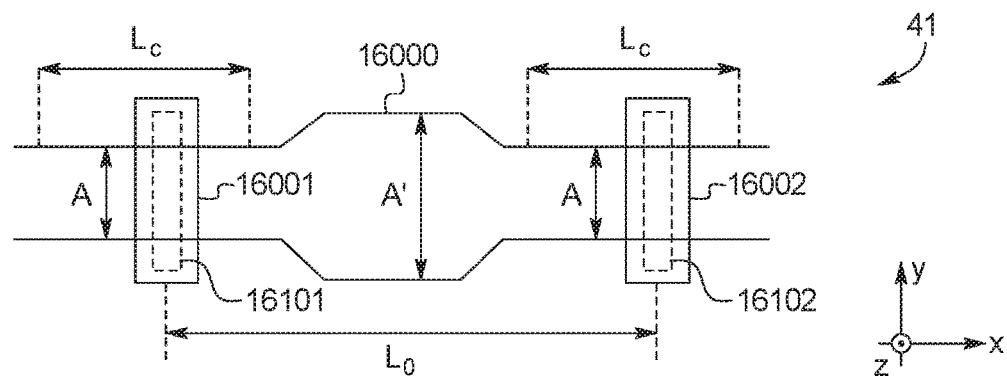
Figure 16J:
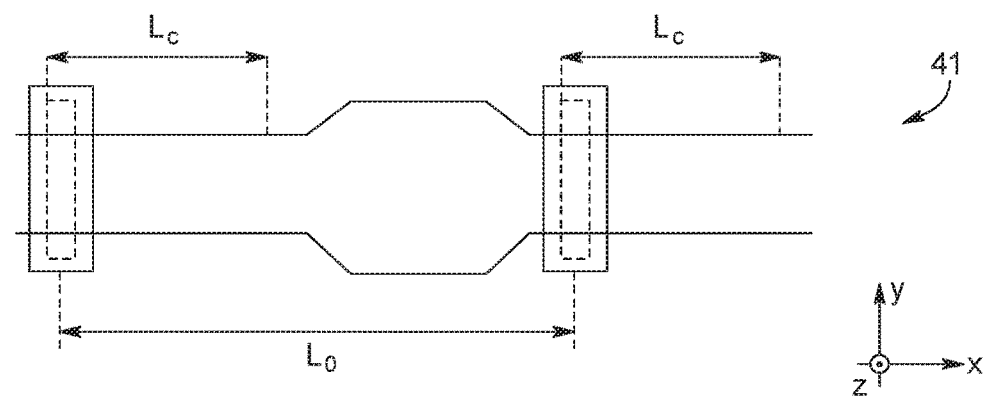
Figure 16J:
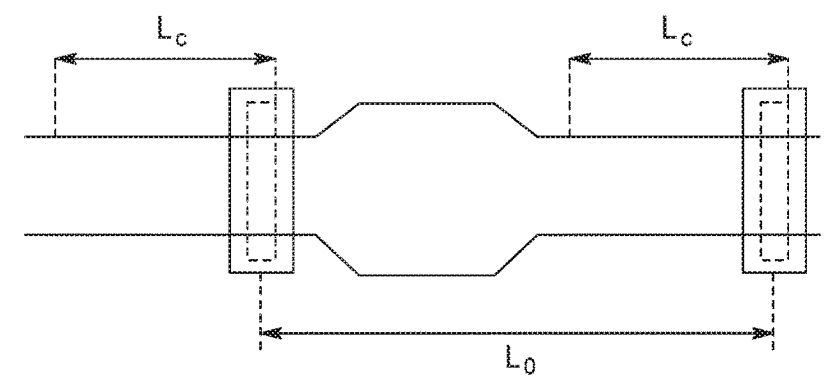

The second type is the alignment tolerance along the channel length (x-axis) direction. This is particularly important for sensing devices that have two or more sensing zones or sensors. An example of a sensing device 41 with two sensors 16001 and 16002 is shown in FIG. 16G. The distance between the two sensors $L_0$ is fixed in the reader instrument, and thus kept as constant during the insertion step. The sensing device is considered misaligned if the channel volume between the two sensors is changed. By designing the fluid channel 16000 to have a cross section area A (FIG. 16H), the channel volume between the two sensors is always kept as a constant of $V=AL_0$. In this way, the sensing device is easily achieving alignment by default. FIG. 16I shows a more complex example where the fluid channel has non-constant cross section area (A≠A'). Nevertheless, the two channel segments can be designed for alignment with the two sensing zones to have a constant cross section area A. These two segments have a length of $L_C$. In this way, the total volume between the two sensors can be kept as constant, while allowing an alignment tolerance of $L_C$ along the channel length direction (x-axis), as shown in FIG. 16J.

Figure 17A:
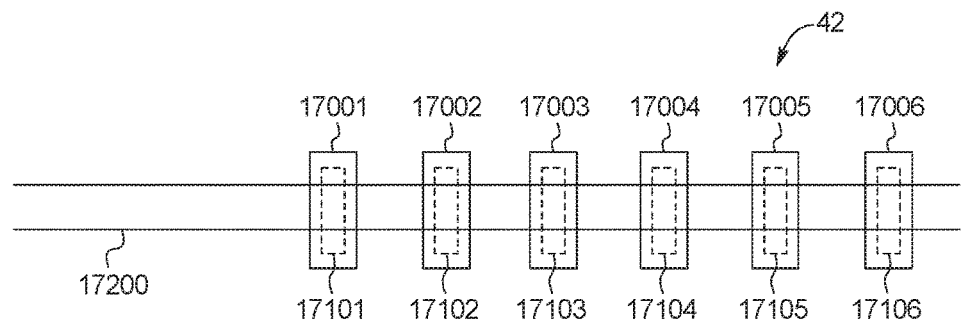
FIGS. 17A to 17C depicts, in accordance with embodiments herein, an example embodiment of a sensing device.
Figure 17B:
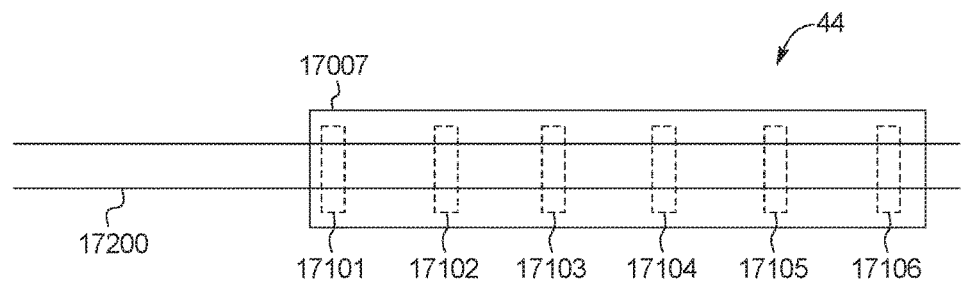
Figure 17C:
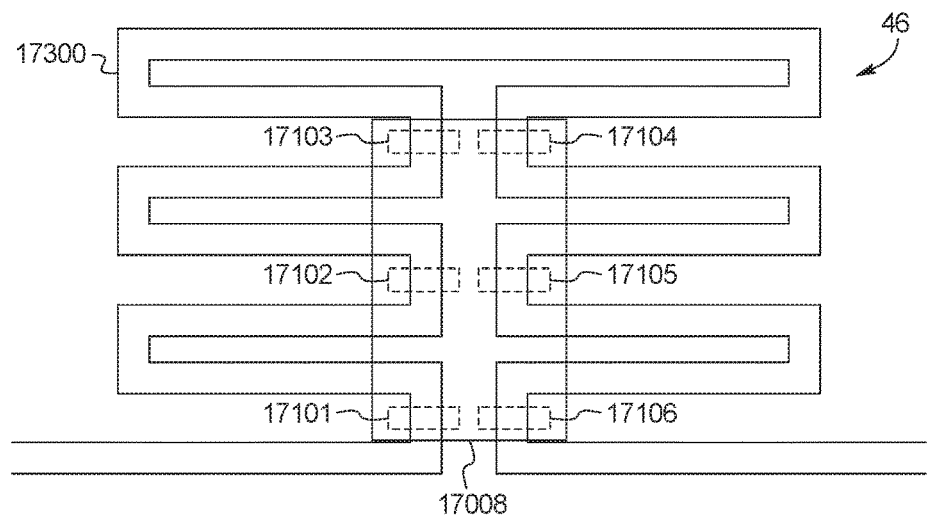

FIGS. 17A to 17C shows embodiments of the sensing device to demonstrate advantages of a sensing device with one sensor having multiple sensing zones versus sensing device with multiple sensors each having one sensing zone. FIG. 17A is a sensing device 42 with six sensors 17001 to 17006, each having one sensing zone respectively. This design has six sensing zones from 17101 to 17106. FIG. 17B is a sensing device 44 with one sensor 17007 having six sensing zones from 17101 to 17106. Using the one sensor design 44 helps to simplify the hardware configuration.

FIG. 17C is another sensing device 46 with one sensor 17008 having six sensing zones from 17101 to 17106. By arranging the fluid channel in a meander shape, and by arranging the sensing zones in a compact configuration where flowpaths of the meander shape converge inward, sensing device 46 achieves more compact a sensor area in comparison to the example of FIG. 17B. When using one sensor to cover a sensor area, the achievable size of the sensor area is limited by physician embodiments of the sensor. For example, if a photodiode is used for measuring optical signal in the sensing device. The surface area of the photodiode is limited, and thus it is advantageous to arrange the sensing zones within a compact size.

Sensor Structures

Figure 18A:
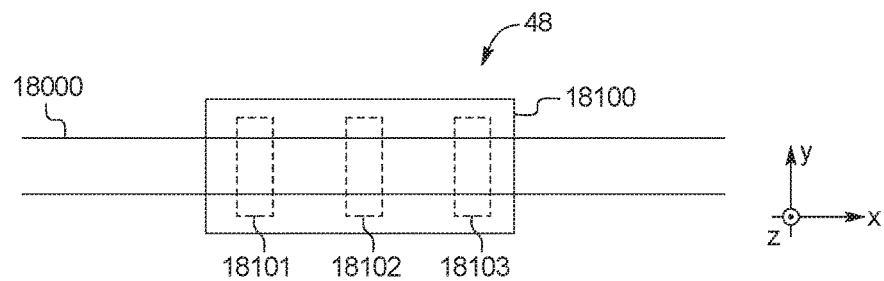
FIGS. 18A to 18E depict, in accordance with embodiments herein, an example embodiment of a sensing device.

In particular embodiments, the sensing device described herein could have additional various structures. For example, FIG. 18A shows an example of a sensing device 40 with one sensor 18100 that has a plurality of three sensing zones 18101, 18102 and 18103 along the length of fluid channel 18000. The channel length is along the x-axis and the channel width is along the y-axis.

Figure 18B:
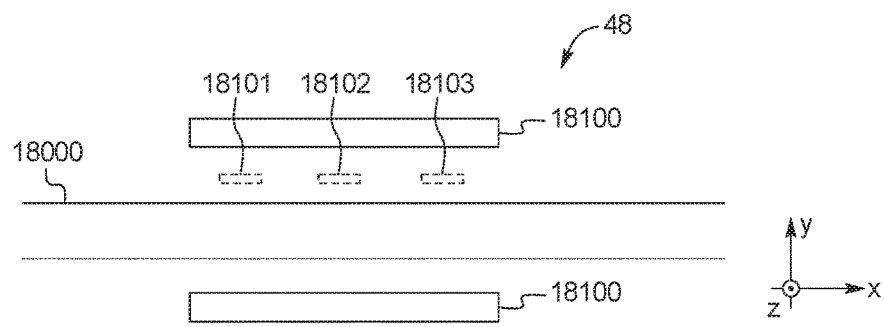

FIG. 18B shows one example embodiment of the structure of sensing device 48. In the illustrated embodiment, sensor 18100 is a sensing pair at two sides of the channel along the z-axis. Fluid channel 18000 is on a disposable cartridge. The sensing pair 18100 includes an external component that is separate from the disposable cartridge. The sensing zones are defined with components integrated on the cartridge, components separated from the cartridge and/or components integrated on the sensing pair. In an embodiment, the sensing pair includes a light source and a light detector, the sensing signal is intensity of transmitted light and the sensing zones are defined by light masking apertures.

Figure 18C:
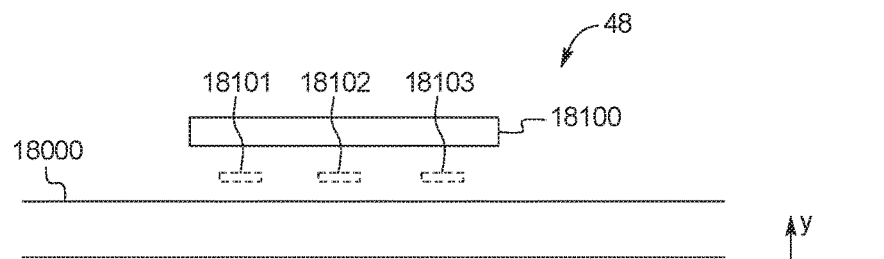

FIG. 18C shows another example embodiment of the structure of sensing device 48. In the illustrated embodiment, sensor 18100 includes a sensing pair at one side of the channel along the z-axis. Fluid channel 18000 is on a disposable cartridge. The sensing pair 18100 is an external component that is separate from the disposable cartridge. In an embodiment, the sensing zones are defined with components integrated on the cartridge, components separated from the cartridge and/or components integrated on the sensing pair. In an embodiment, the sensing pair includes a light source and a light detector, and the sensing signal is intensity of reflected light and the sensing zones are defined with light masking apertures.

Figure 18D:
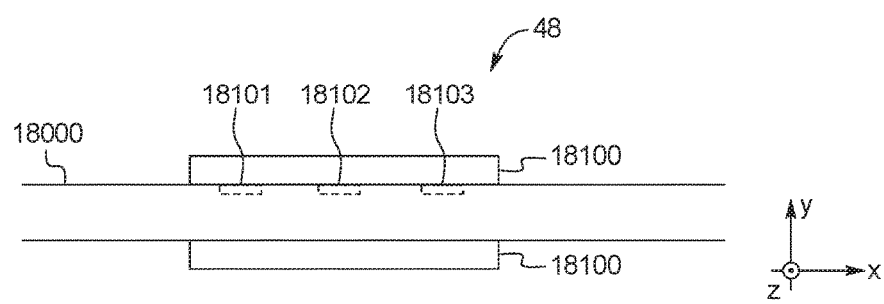

FIG. 18D shows another example embodiment of the structure of sensing device 48. In the illustrated embodiment, sensor 18100 includes a sensing pair at two sides of the channel along the z-axis. Both the sensing pair 18100 and the fluid channel 18000 are on a disposable cartridge. In one embodiment, the sensing zone is defined either with the effective zones of the sensing signals or components integrated on the disposable cartridge. In an embodiment, the sensing pair includes a pair of electrodes, the sensing signal is electrical impedance, and the sensing zones are defined with apertures of electrical insulation layers.

Figure 18E:
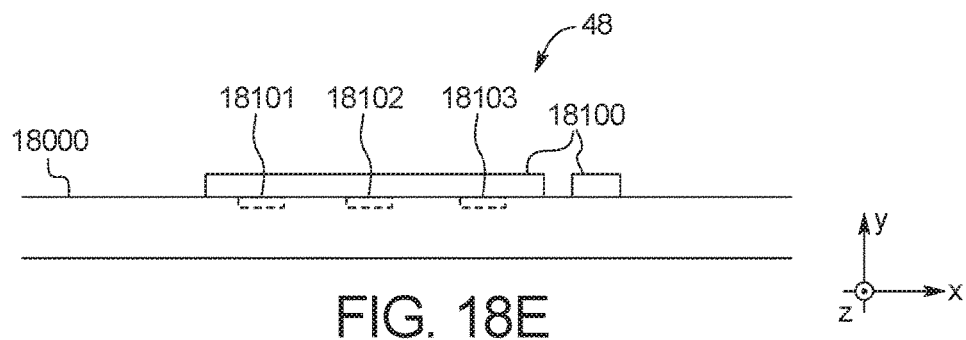

FIG. 18E shows yet another example embodiment of the structure of sensing device 48. In the illustrated embodiment, sensor 18100 includes a sensing pair at one side of the channel along the z-axis. Both the sensing pair 18100 and the fluid channel 18000 are on a disposable cartridge. In one embodiment, the sensing zone is defined either with the effective zones of the sensing signals or components integrated on the disposable cartridge. In an embodiment, the sensing pair includes a pair of electrodes, the sensing signal is the amount of electrical charges in the fluid, and the sensing zones are defined with apertures of electrical insulation layers.

Physics of Sensing Signals

In accordance with various embodiments described herein, the sensing devices described herein can use different sensing signals to detect whether there is fluid in the channel. Examples of the sensing signals include but not limit to optical signal, electrical signals, acoustic signals and thermal signals, etc.

In particular embodiments, the sensing signals can be optical signals. For example, the sensor could comprise of a pair of light source and light detector. The light source emits a light signal that interacts with a fluid in the channel and is then detected by the light detector. The sensing zone is defined as the effective zone of the light signal and/or an extra optical aperture. The detected light has distinct levels when there is fluid in the sensing zone of the channel versus when there is not. Examples of the light source include an LED, laser diode, light bulb, ambient light, etc. Examples of the light detector include a photodiode, avalanche photodiode, photomultiplier tube, CCD sensor, CMOS sensor, etc. Examples of the detected light signals include intensity of transmitted light, intensity of absorbed light, intensity of reflected light, intensity of fluorescence, intensity of chemiluminescence, polarization of light, etc. In an embodiment, the light source is an LED, the light detector is a photodiode and the detected signal is the intensity of the transmitted/absorbed light.

Figure 19A:
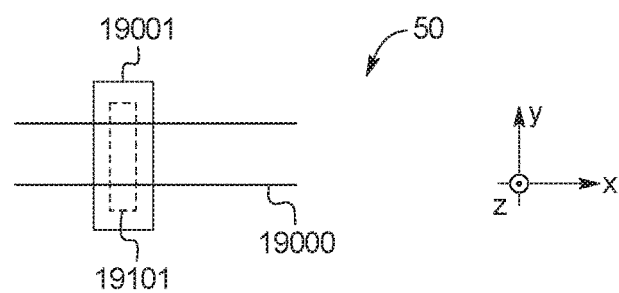
FIGS. 19A to 19E depict, in accordance with embodiments herein, an example embodiment of a sensing device.
Figure 19B:
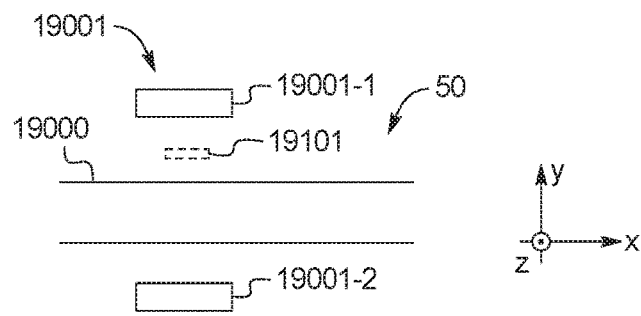
Figure 19C:
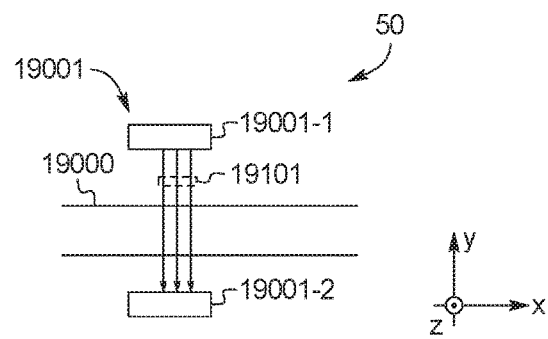

In particular embodiments, the sensing signal can be transmitted light. FIGS. 19A to 19C show one example of the sensing device 50 that utilize the transmitted light as the sensing signal. In this sensing device, as shown in FIG. 19B, the sensor 19001 consist a light emitter 19001-1 and a light detector 19001-2. The sensing zone 19101 is defined with an aperture where light can pass through and interact with the channel. The light signal from the emitter 19001-1 passes through the aperture, interacts with the fluid channel, and is measured in the detector 19001-2, as shown in FIG. 19C. The detector measures the intensity of transmitted light, and the sensing device use this signal to determine if there is fluid versus no fluid (e.g. air) in the sensing zone of the channel.

Figure 19D:
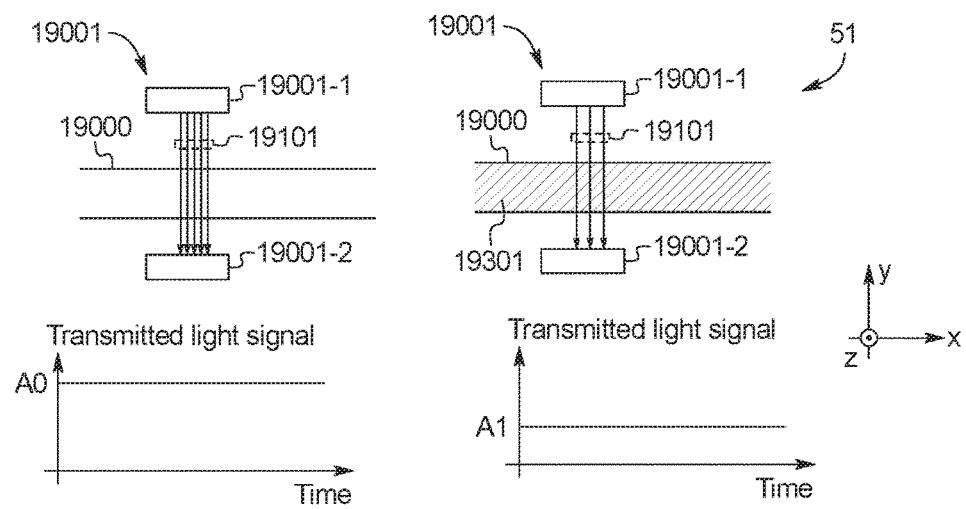

In particular embodiments, the change of the transmitted light signal is caused by light absorption of the fluid sample, as shown in the example of sensing device 51 in FIG. 19D. When there is no fluid (e.g. air) in the sensing zone of the channel, the detector 19001-2 measures a transmitted light intensity A0. When the channel is filled with fluid, the detector 19002-2 measures another transmitted light intensity A1. By choosing proper light wavelength, the fluid can absorb a significant part of the transmitted light. Therefore, the detected signal A1 is less than A0. The detectable signal difference (A0–A1) is determined by the amount of the light absorbed by the fluid.

The amount of light absorption can be determined by the Beer-Lambert Law: $A=\varepsilon bc$, where A is the amount of light absorption, $\varepsilon$ is the attenuation coefficient of the sample, b is the path length of the light absorption, and c is the concentration of analyte in the sample. For a given sample (fixed $\varepsilon$ and c), the longer the light path length b is, the higher the amount of light being absorbed.

Examples of the fluid sample include, for example, water, biological fluids (blood, serum, plasma, urine, etc.), biological fluids diluted with buffer, etc. By choosing the proper light wavelength for the targeted fluid (increasing the attenuation coefficient E), the light absorption and thus maximize the detectable signal difference (A1–A0) can be maximized. For example, blood sample absorbs strongly the light in the green wavelength (e.g. 520-560 nm). Therefore, using the green light wavelength can introduce a significant signal difference (A0–A1). Meanwhile, by increasing the channel height along the z-axis (increasing light path length b), the amount of light absorbed can be increased, and thus increase the detectable signal difference (A1–A0) as well. On the other hand, by decreasing the channel height along the z-axis, the light path length will be decreased and thus decrease the detectable signal difference (A1–A0).

Figure 19E:
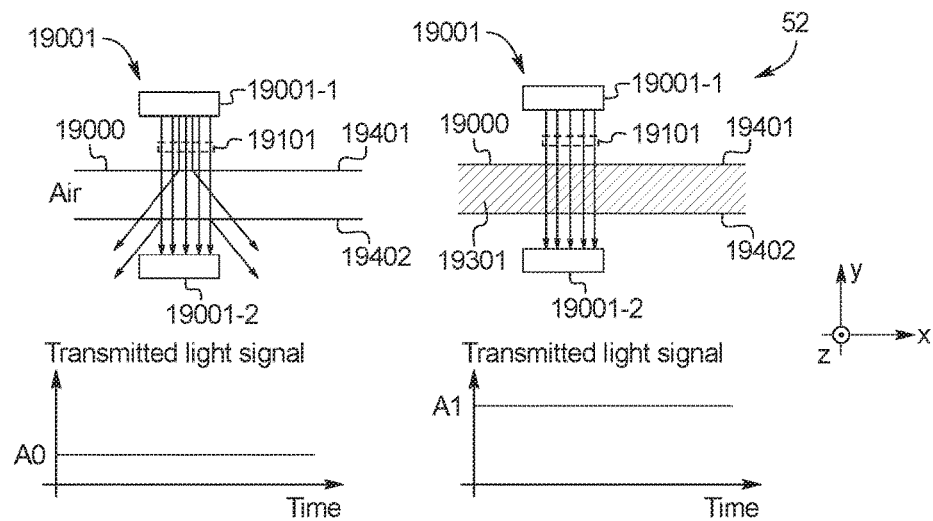

In other particular embodiments, the change of the transmitted light is mainly caused by light scattering at the channel inner surface, as shown with sensing device 52 in FIG. 19E. When light transmitting from the sensor's emitter 19001-1 towards the sensor's detector 19002-2, part of the light is scattered at the channel inner surface (interface between the channel material, e.g. plastic or glass, and the content inside the channel, e.g. air or fluid) and is not received in the sensor's detector. The higher the level of light scattering, the lower the amount of light received in the detector, thus leading to a lower measured signal level. When there is no fluid in the sensing zone of the channel, e.g. air or vacuum in the channel, a higher level of light scattering is introduced and thus the detector 19001-2 measures a lower transmitted light intensity A0. When the channel is filled with fluid, a lower level of light scattering is introduced and thus the detector 19002-2 measures a higher transmitted light intensity A1. The sensor can measure the signal difference (A0−A1) to determine if the sensing zone has fluid or has no fluid (e.g. is filled with air).

Figure 20A:
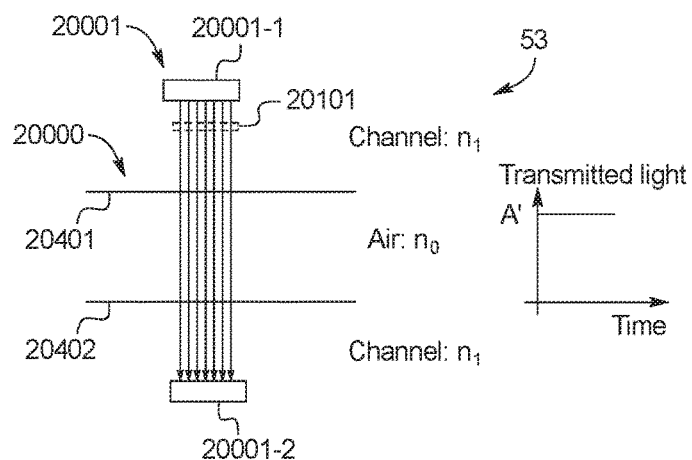
FIGS. 20A to 20C depict, in accordance with embodiments herein, an example embodiment of a sensing device.
Figure 20B:
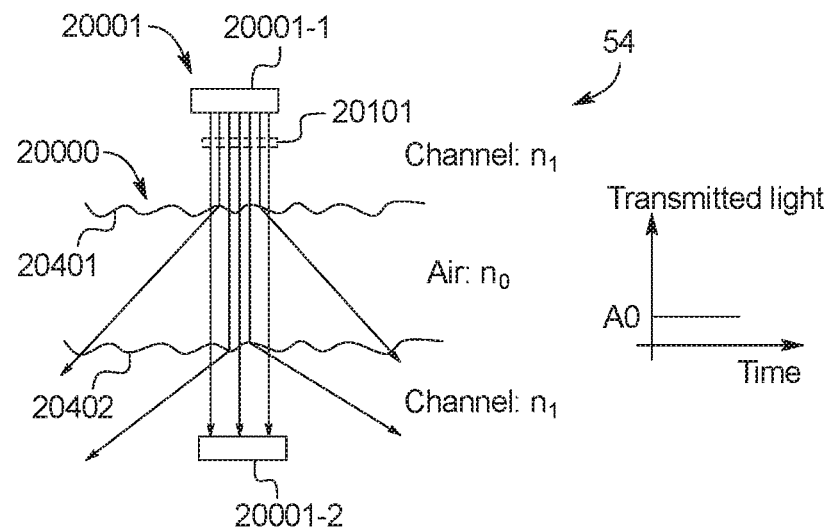
Figure 20C:
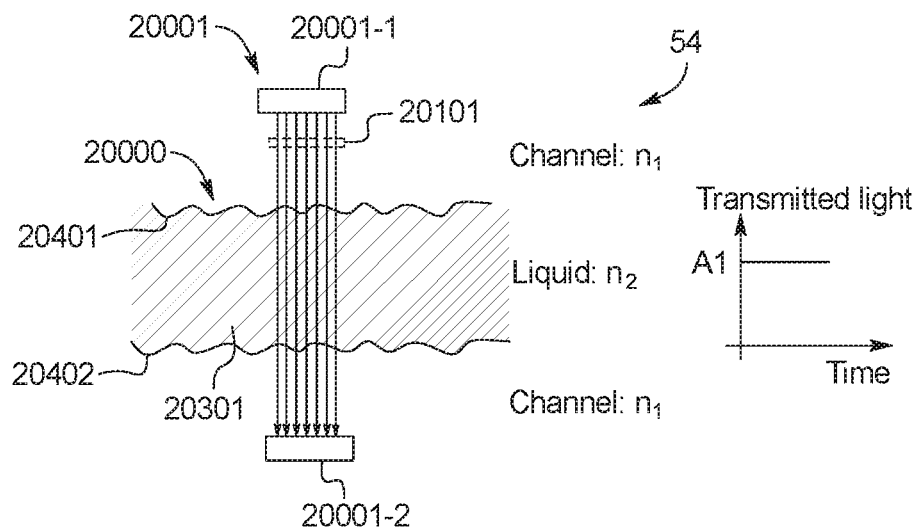

FIG. 20 further illustrates how this sensor design with light scattering works. FIG. 20A shows a sensing device 53 that measures the transmitted light as the sensing signal. The light from the sensor's emitter 20001-1 illuminates perpendicularly on the channel's inner surface 20401 and 20402. When surfaces 20401 and 20402 are perfectly smooth, there is no light scattering and all the light can be transmitted to the sensor's detector 20001-2, which detects a high signal level of A'. FIG. 20B shows a similar sensing device 54 with the difference that the channel's inner surfaces 20401 and 20402 have a certain roughness. When the channel material has a refractive index ($n_1$) that is not equal to the refractive index of air in the channel ($n_0$), part of the light from the sensor's emitter 20001-1 is scattered at the rough surface and the sensor's detector 20001-2 detects a decreased signal level A0. For channel materials such as plastic (refractive index $n_1$ ranges from 1.3 to 1.7) or glass ($n_1$ ranges from 1.4 to 1.7), the mismatch of the refractive index with air ($n_0$=1.0) is significant, and thus there is significant light scattering at the channel surface. When a fluid sample ($n_2$ ranges from 1.3 to 1.7) enters the channel, as shown in FIG. 20C, it replaces the air ($n_0$=1.0) and reduces the mismatch of refractive index with the channel material (plastic $n_1$=1.3 to 1.7, or glass $n_1$=1.4 to 1.7). Therefore, the amount of light scattered is reduced, and the sensor's detector measures an increased light signal A1 (A1>A0). In an ideal case, if the fluid sample's refractive index is equal to the channel material's refractive index ($n_3$=$n_1$), there is no scattering at the interface and the sensor's detector measures a maximum level of A1.

In view of above, in designing a sensing device with light scattering, it is important to consider the roughness of the inner surface of the channel and to consider the refractive index of the channel material as well as the fluid sample. In an embodiment, the channel materials can be plastics such as Cyclic Olefin Copolymer (COC, refractive index near 1.53), Cyclic Olefin Polymer (COP, refractive index near 1.53), polycarbonate (PC, refractive index near 1.59), Polymethyl Methacrylate (PMMA, refractive near 1.49), Polyethylene Terephthalate (PEF refractive index near 1.60), Polystyrene (PS, refractive index near 1.6), and other plastic materials known to a person of ordinary skill in the art. In an embodiment, the sensing device design is suitable for detecting various fluid samples that have refractive index ($n_2$) in the range of 1.3 to 1.65, such as water, analyte solution in water, body fluid (blood, urine, tear, etc.), body fluid solution in solvent, and other fluid samples known to person skilled in the art. In preferred embodiments, the sensing device has a roughness of the channel inner surface in the range of Sa from 0.1 nm to 10 nm. In other preferred embodiments, the sensing device has a roughness of the channel inner surface in the range of Sa from 10 nm to 1 um. In other preferred embodiments, the sensing device has a roughness of the channel inner surface in the range of Sa from 1 um to 10 um. In other preferred embodiments, the sensing device has a roughness of the channel inner surface in the range of Sa from 10 um to 100 um.

The light scattering design is significantly different from the previous embodiments of measuring light absorption as the sensing signal. First, the sensor design with light scattering measures a signal increase (A0<A1) when detecting fluid (replacing air or vacuum) in the channel, whereas the sensor design with light absorption measures a signal decrease (A0>A1). Second, the amplitude of signal difference (A0−A1) in the sensor design with light scattering is mostly determined by two design factors: the surface roughness of the channel inner surface and the refractive index mismatch between the channel material and the content inside the channel (air versus fluid). Meanwhile, the amplitude of signal difference (A0−A1) in the sensor design with light absorption is mostly determined by another two factors: the attenuation coefficient E of the fluid and the length of the light path (e.g. the depth of channel along the z-axis in FIG. 19).

For cartridge applications with small fluid channel dimensions, the light path length is limited by the channel size, and thus the amplitude of the measureable signal difference (A0−A1) is limited. In this case, the sensor design with light scattering is advantageous, because its signal difference (A0−A1) is determined mainly by the surface roughness and refractive index mismatch. Therefore, even a small channel size can introduce significant light scattering, by properly choosing the channel surface roughness and matching the refractive index between the channel material and the fluid sample.

In practical use, light absorption and light scattering often exist simultaneously in the sensing device. Their relative impact on the signal difference (A0−A1) can be optimized by designing the channel dimension, fluid sample property (attenuation coefficient ε, concentration of analyte in the sample c, refractive index $n_2$), channel material (refractive index $n_1$), channel surface roughness (Sa), light wavelength and other properties known to person skilled in the art.

In yet other embodiments, the sensing signals could be electrical signals. For example, the sensor could comprise of a pair of electrodes. The electrical field generated by the electrode pair can interact with a fluid in the channel. In one embodiment, the sensing zone is defined as the effective zone of the electrical field and/or an insulation aperture. The detected signals at the electrode pair have distinct levels when there is fluid in the sensing zone of the channel versus when there is not. Examples of the detected electrical signals include but not limit to values of electrical impedance (e.g. resistance, capacitance, inductance), amplitudes of AC/DC current, amplitudes of AD/DC voltages, frequency spectrum of the current/voltage, etc.

In other embodiments, the sensing signals could be acoustic signals. For example, in one embodiment, the sensor comprises of a pair of an acoustic source and an acoustic detector. The acoustic signal from the source interacts with a fluid in the channel. In an embodiment, the sensing zone is defined as the effective zone of the acoustic field and/or an acoustic aperture. The detected signals have distinct levels when there is fluid in the sensing zone of the channel versus when there is not. Examples of the detected acoustic signals include but not limited to intensity of the acoustic wave, and/or frequency of the acoustic wave.

In other embodiments, the sensing signals are thermal signals. For example, in an embodiment, the sensor comprises a pair of a thermal source and a thermal detector. The thermal signal from the source interacts with a fluid in the channel. In an embodiment, the sensing zone is defined as the effective zone of the thermal pathway and/or a thermal insulation aperture. The detected signals have distinct levels when there is fluid in the sensing zone of the channel versus when there is not. Examples of the detected thermal signals include temperature.

Various embodiments of the disclosure are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the disclosure known to the applicant at this time of filing the application has been presented and is intended for the purposes of illustration and description. The present description is not intended to be exhaustive nor limit the disclosure to the precise form disclosed and many modifications and variations are possible in the light of the above teachings. The embodiments described serve to explain the principles of the disclosure and its practical application and to enable others skilled in the art to utilize the disclosure in various embodiments and with various modifications as are suited to the particular use contemplated. Therefore, it is intended that the disclosure not be limited to the particular embodiments disclosed for carrying out the disclosure.

While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A fluidic device comprising:
a disposable cartridge including a fluid channel configured to receive a fluid flow;
an instrument configured to receive the disposable cartridge, the instrument including at least one sensor having a plurality of fluid sensing zones spaced along the fluid channel when the disposable cartridge is received by the instrument, each fluid sensing zone configured to determine a presence or absence of fluid at a respective portion of the fluid channel; and
a control unit configured to (i) receive a signal indicative of the presence or absence of the fluid at each of the fluid sensing zones, and (ii) determine a volume of a fluid plug or a volume ratio of gas bubbles in a fluid based on the presence or absence of the fluid at each of the fluid sensing zones.

2. The fluidic device of claim 1, wherein the plurality of fluid sensing zones are spaced along a length of the fluid channel when the disposable cartridge is received by the instrument.

3. The fluidic device of claim 1, wherein the plurality of fluid sensing zones are spaced along a width of the fluid channel when the disposable cartridge is received by the instrument.

4. The fluidic device of claim 1, wherein the plurality of fluid sensing zones are each located on separate sensors configured to measure the presence or absence of fluid at the respective portion of the fluid channel along the length of the fluid channel.

5. The fluidic device of claim 1, wherein the plurality of fluid sensing zones are each located on the same sensor, wherein the fluid channel has a winding shape through the disposable cartridge, and wherein the plurality of fluid sensing zones are aligned with sections of the fluid channel that converge into a centralized portion of the sensor.

6. The fluidic device of claim 1, wherein the fluid channel has a known cross-sectional area, and wherein the control unit uses the known cross-sectional area of the fluid channel to determine at least one of a volume displacement, a flow rate or a flow velocity of the fluid based on the presence or absence of the fluid at each of the fluid sensing zones.

7. A fluidic device comprising:
a disposable cartridge including a fluid channel configured to receive a fluid flow;
an instrument configured to receive the disposable cartridge, the instrument including at least one sensor having a plurality of fluid sensing zones spaced along a length of the fluid channel when the disposable cartridge is received by the instrument, each sensor including a light emitter and a light receiver; and
a control unit configured to determine a volume displacement of a fluid flow or a volume of a fluid plug in the fluid channel based on a changed level of light transmission in a first sensing zone and a changed level of light transmission in a second sensing zone, wherein the level of light transmission is changed by the amount of light scattered with presence or absence of fluid in the fluid sensing zone.

8. The fluidic device of claim 7, wherein the controller is configured to use a surface roughness of at least a portion of the fluid channel to determine the presence or absence of fluid at each of the fluid sensing zones, wherein the surface roughness changes the amount of light scattered in each sensor when there is presence or absence of fluid.

9. The fluidic device of claim 7, wherein the controller is configured to use a refractive index of a material forming at least a portion of the fluid channel to determine the presence or absence of fluid at each of the fluid sensing zones, wherein the difference between the refractive index of the material and the refractive index of fluid in the channel changes the amount of light scattered in each sensor.

10. The fluidic device of claim 7, wherein the controller is configured to determine at least one of a flow velocity or a volume ratio of gas bubbles of the fluid based on detecting the fluid flow entering each of the fluid sensing zones.

11. A method of configuring a disposable cartridge comprising:
designing a disposable cartridge to have a fluid channel configured to receive a particular fluid sample;
configuring the fluid channel to align with a plurality of fluid sensing zones corresponding to at least one light emitter and at least one light receiver of a reader instrument when the disposable cartridge is received in the instrument for measurements; and determining a fluid volume displacement, a volume of a fluid plug or a volume ratio of gas bubbles in a fluid based on the presence or absence of the fluid at each of the fluid sensing zones.

12. The method of claim 11, which includes programming the reader instrument to determine the presence or absence of fluid in the fluid channel of the disposable cartridge based on the light transmission from the respective emitter to the respective receiver, wherein the level of light transmission is changed by the amount of light scattered when there is a presence or absence of fluid in the channel.

13. The method of claim 11, which includes configuring the portion of the fluid channel to align with a plurality of light emitters and light receivers along the width of the fluid channel.

14. The method of claim 11, which includes configuring the portion of the fluid channel to align with a plurality of light emitters and light receivers along the length of the fluid channel.

15. The method of claim 14, which includes allowing for an alignment tolerance when aligning the plurality of light emitters and light receivers with the fluid channel in the cartridge by fixing the distance between the plurality of light emitters and light receivers before alignment.

16. A fluidic device comprising:
a disposable cartridge including a fluid channel configured to receive a fluid flow;
an instrument configured to receive the disposable cartridge, the instrument including at least one sensor having a plurality of fluid sensing zones spaced along the fluid channel when the disposable cartridge is received by the instrument, each sensor comprising a light emitter, a light receiver and a plurality of light masking apertures defining multiple fluid sensing zones; and
a control unit configured to (i) receive a signal indicative of the presence or absence of the fluid at each of the fluid sensing zones, wherein the signal indicates the level of the light transmitted from the respective light emitter to the respective light receiver at the fluid sensing zones, and (ii) analyze the received signal to determine a volume of a fluid plug or a volume ratio of gas bubbles in a fluid based on a presence or absence of the fluid at each of the fluid sensing zones.

17. The fluidic device of claim 16, wherein the plurality of fluid sensing zones are spaced along a length of the fluid channel when the disposable cartridge is received by the instrument.

18. The fluidic device of claim 16, wherein the plurality of fluid sensing zones are spaced along a width of the fluid channel when the disposable cartridge is received by the instrument.

19. The fluidic device of claim 16, wherein the plurality of fluid sensing zones are each located on separate sensors configured to measure the presence or absence of fluid at the respective portion of the fluid channel along the length of the fluid channel.

20. The fluidic device of claim 16, wherein the instrument comprises at least one sensor that has two or more sensing zones.

21. The fluidic device of claim 16, wherein at least one sensor comprises a light emitter, a light receiver and two or more light masking apertures defining two or more of the fluid sensing zones, and wherein the controller unit is configured to detect three different levels of signal from the at least one sensor for the following: (i) presence of fluid in one fluid sensing zone; (ii) presence of fluid in two fluid sensing zones; and (ii) absence of fluid in the fluid sensing zones.

22. The fluidic device of claim 16, wherein each light masking aperture is initially separated from the disposable cartridge and overlaps with the fluid channel of the disposable cartridge after the disposable cartridge is received by the instrument.

23. The fluidic device of claim 7, wherein the fluid channel overlapping with the fluid sensing zones is configured to have a surface roughness that scatters at least a portion of the light transmission from the respective emitter to the respective receiver, and the control unit is configured to determine a fluid entering the fluid sensing zones by detecting an increased level of the light transmission.

24. The fluidic device of claim 23, wherein the surface roughness of the fluid channel overlapping with the sensing zones is in the range of about 0.1 nm to 10 nm, 10 nm to 1 um, 1 um to 10 um or 10 um to 100 um.

25. The fluidic device of claim 7, wherein the instrument comprises two or more sensors, and the controller is configured to determine the volume displacement of the fluid flow or the volume of the fluid plug in the fluid channel by detecting a changed level of light transmission in a first sensor and a changed level of light transmission in a second sensor.

26. The fluidic device of claim 7, wherein the at least one sensor comprises a light masking aperture.

27. The fluidic device of claim 9, wherein a material forming at least a portion of the fluid channel is configured to have a refractive index of about 1.3 to 1.7.

* * * * *